United States Patent [19]
Sheehan et al.

[11] Patent Number: 5,734,739
[45] Date of Patent: Mar. 31, 1998

[54] METHOD FOR DETERMINING THE CONTOUR OF AN IN VIVO ORGAN USING MULTIPLE IMAGE FRAMES OF THE ORGAN

[75] Inventors: Florence H. Sheehan, Mercer Island; Robert M. Haralick, Seattle; Jasjit Suri, Seattle; Yong Shao, Seattle, all of Wash.

[73] Assignee: University of Washington, Seattle, Wash.

[21] Appl. No.: 704,016

[22] Filed: Aug. 26, 1996

Related U.S. Application Data

[63] Continuation-in-part of Ser. No. 251,733, May 31, 1994, Pat. No. 5,570,430.

[51] Int. Cl.[6] .................................................. G06K 9/00
[52] U.S. Cl. ..................... 382/128; 382/130; 382/131; 382/199; 128/653.1; 128/656
[58] Field of Search ......................... 382/128, 129, 382/130, 131, 132, 199; 378/98.2; 128/653.1, 659, 656; 250/369

[56] References Cited

U.S. PATENT DOCUMENTS 5,065,435  11/1991  Oe ................................................ 382/128
5,287,396   2/1994  Stegehuis ..................................... 378/98.2
5,570,430  10/1996  Sheehan et al. ............................ 382/128

*Primary Examiner*—Jose L. Couso
*Assistant Examiner*—Anh Hong Do
*Attorney, Agent, or Firm*—Ronald M. Anderson

[57] ABSTRACT

An automated method for evaluating image data taken over a sequence of image frames to determine a contour of a left ventricle (LV). The sequence of image frames are converted to digital data that identify a gray scale value for each pixel in each image frame. An initial LV region is estimated based upon training data parameters derived from processing manually drawn contours of the LV in the hearts of other individuals, corresponding to the sequence of image frames being analyzed. Prior to producing the initial estimate, the location of the aortic valve in the sequence of image frames for the patient is determined to serve as a reference. The data derived frown the contours of the LVs for the other hearts are rotated and translated relative to this reference to insure that the training data information corresponds to the position and orientation of the LV being analyzed. In addition, the effects of tissue mass comprising a diaphragm adjacent to the inferior portion of the LV are compensated by masking out the diaphragm. Uncertainty of the contour of the LV in this portion due to the presence of the diaphragm is thereby minimized. The resulting automatically determined contours of each image frame can be displayed to enable a physician to more readily diagnose physiological defects of the heart.

26 Claims, 17 Drawing Sheets

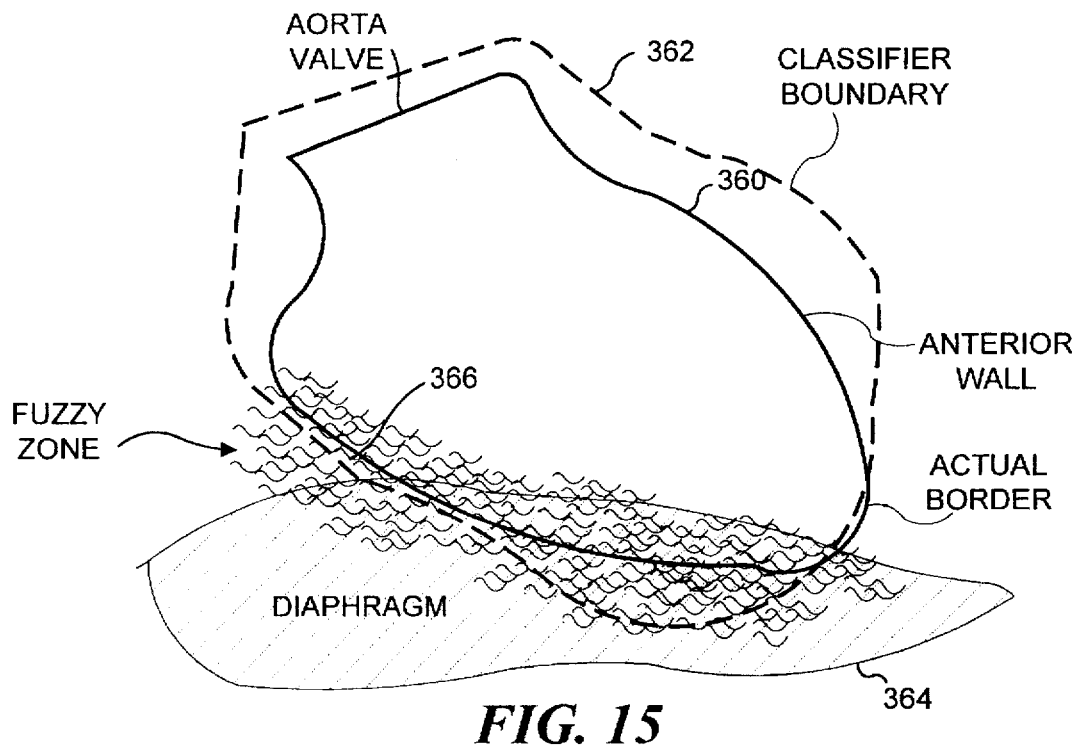
FIG. 15
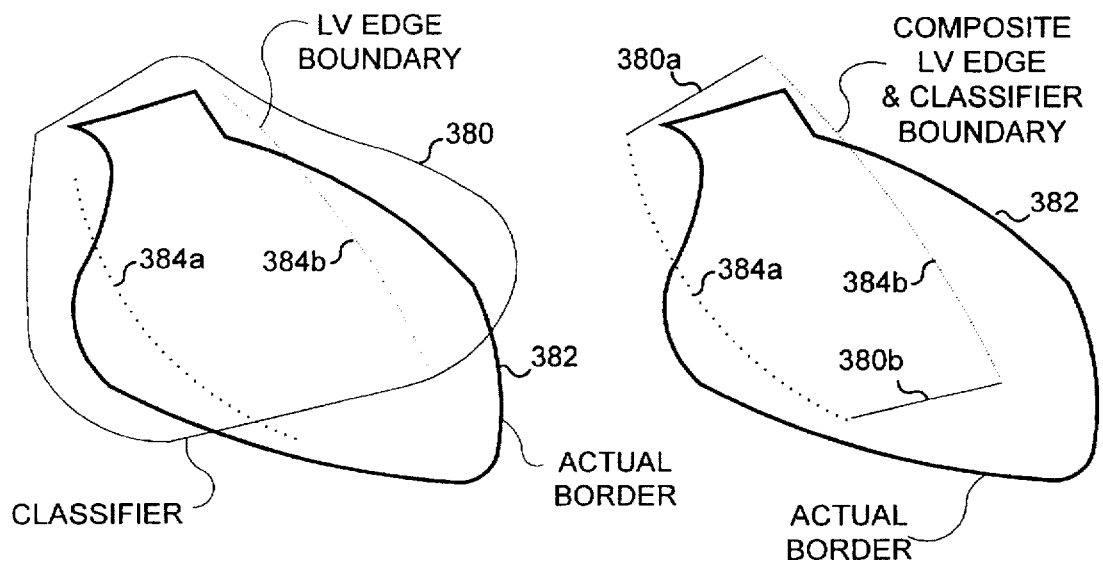
FIG. 16A  FIG. 16B

METHOD FOR DETERMINING THE CONTOUR OF AN IN VIVO ORGAN USING MULTIPLE IMAGE FRAMES OF THE ORGAN

RELATED APPLICATION

This application is a continuation-in-part application, based on prior application Ser. No. 08/251,733, filed on May 31, 1994, now U.S. Pat. No. 5,570,430, the benefit of the filing date of which is hereby claimed under 35 U.S.C. § 120.

FIELD OF THE INVENTION

The present invention generally pertains to a method for determining a boundary or contour of an internal organ based upon image data, and more specifically, is directed to a method for determining the contour of the organ based on processing image data for multiple image frames.

BACKGROUND OF THE INVENTION

Contrast ventriculography is a procedure that is routinely performed in clinical practice during cardiac catheterization. Catheters must be intravascularly inserted within the heart, for example, to measure cardiac volume and/or flow rate. Ventriculograms are X-ray images that graphically represent the inner (or endocardial) surface of the ventricular chamber. These images are typically used to determine tracings of the endocardial boundary at end diastole (ED), when the heart is filled with blood, and at end systole (ES), when the heart is at the end of a contraction during the cardiac cycle. By manually tracing the contour or boundary of the endocardial surface of the heart at these two extremes in the cardiac cycle, a physician can determine the size and function of the left ventricle and can diagnose certain abnormalities or defects in the heart. Of the end systole and end diastole images, the former is perhaps the most useful.

To produce a ventriculogram, a radio opaque contrast fluid is injected into the left ventricle (LV) of a patient's heart. An X-ray source is aligned with the heart, producing a projected image representing, in silhouette, the endocardial surface of the heart (myocardium) muscle. The silhouette image of the LV is visible because of the contrast between the radio opaque fluid and other surrounding physiological structure. Manual delineation of the endocardial boundary is normally employed to determine the contour, but this procedure requires time and considerable training and experience to accomplish accurately. Alternatively, a medical practitioner can visually assess the ventriculogram image to estimate the endocardial contour, but such evaluation is often little better than an educated guess, particularly if the ventriculogram being assessed was made at or near end systole. Clearly, an automated border detection technique that can produce more accurate results, in much less time than the manual evaluation, would be preferred.

Several automatic border detection algorithms have been developed to address the above-noted problem. In U.S. Pat. No. 5,268,967, a number of different prior art methods are discussed for improving the definition with which images can be resolved to identify specific portions of the body. It is suggested by this reference that a histogram-based tone-scale transformation is a simple and effective way to adjust the contrast of an image, but that other techniques must be employed to distinguish the desired foreground portion of an image from the background clutter and to distinguish the object in question from the foreground and background. After discussing what others have done to achieve this goal and the problems with these techniques, the patent discloses a method that can be applied to any digital radiographic input image. The method disclosed in the patent includes the steps of edge detection, block generation, block classification, block refinement, and bit map generation. More specifically, after the edges of the object are detected in the first step, the image is broken into a set of nonoverlapping, contiguous blocks of pixels, which are classified into foreground, background, and object, on a block-by-block basis. The block classification step determines in which of ten possible states each block belongs, using a set of clinically and empirically determined decision rules. By evaluating the fine structure within each block, the block classification is refined, so that a two-valued or binary image is produced that functions as a template for any further image processing to be done on the image.

Another technique related to automated border detection is based upon identifying a gradient of the gray scale values comprising an image. In this prior art technique, a gray scale threshold gradient value is applied to process the gray scale image data of a ventriculogram in order to identify the boundary of the LV, and further processing may be employed to improve the accuracy with which the border is identified. Alternatively, it is suggested that landmarks or recognizable shapes or gray scale value combinations can be tracked over time to determine the direction and velocity of motion, which are represented as flow vectors. By analyzing the pattern of flow vectors, motion of the organ can be assessed. However, these flow vectors do not directly indicate the contour of the organ.

Yet another technique that is sometimes employed to determine the contour of an organ is based on digital subtraction. A mask image is recorded prior to introduction of a radio opaque contrast substance into the organ. This mask image may contain radio opaque structures such as ribs and vertebrae, which tend to interfere with discerning the coutour of the organ. After the radio opaque contrast substance is introduced into the organ and a second image is produced, the mask image is digitally subtracted from the second image, thereby removing the clutter in the second image that is not the organ in question. In practice, this technique is difficult to implement because registration between the mask image and the subsequent second image of the organ made perceptible by the radio opaque contrast substance is difficult to achieve. A variation of this technique employs time interval delay subtraction, wherein an image that was previously made close in time is subtracted from an image being analyzed, so that a difference image is produced that contains only the part of the organ that moved during the time interval between the two images. However, any part of the organ that does not move between the times that the two images were made cannot be delineated.

Morphological operators can also be employed to process image data in order to define the boundaries of objects. Such techniques are often more general in application, e.g., relating to artificial vision systems, and are therefore not constrained by physiological considerations.

A paper entitled "Medical Image Analysis using Model-Based Optimization" by James S. Duncan, Lawrence H. Staib, Thomas Birkhölzer, Randall Owen. P. Anandan, and Isil Bosma (IEEE, 1990), suggests the use of mathematical models based on empirically determined data for analysis of diagnostic medical images. In the second example discussed in this paper, a parametric shape model with an image-derived measure of boundary strength is employed. Use of the empirical data for the model improves its accuracy, but the results are still somewhat arbitrary.

Most of the prior art dealing with the problem of boundary determination has focused on analysis of a single image. Even the best of the currently available automated algorithms for determining the contour of an organ such as the heart have a very low success rate and typically require human correction to avoid significant errors. One of the greatest problems with existing automated techniques is that they do not apply knowledge of the expected shape and motion of the specific chamber/organ being analyzed in the manner that a physician would if evaluating the image. To attain at least the accuracy of an expert analyzing the image, an automated method should employ as much information derived from the imaging as possible to delineate the surface of the organ. Further, the automated system should accomplish the task more efficiently and quickly than a human. Toward that end, it has become apparent that more information than can be obtained from a single image will improve the accuracy with which an automated technique can determine the contour of an organ. Analysis of more than one image can provide the additional information needed for an automated method to achieve greater accuracy and can provide the physician more information about the heart or other organ than current techniques.

A method for automatically determining the boundary of the LV (or other organ) is disclosed in a commonly assigned U.S. patent application Ser. No. 08/251,733, filed May 31, 1994, now U.S. Pat. No. 5,570,430, having the same title as the present case. The disclosure and drawings of this earlier application are incorporated herein by reference, which is entirely permissible, since a Notice of Allowance has been received in connection with the referenced application. In the method disclosed therein, training data developed by manually evaluating the image data for the hearts of over 300 different individuals are employed to derive parameters used for classifying pixels in the images of a patient's heart to form an initial estimate of the region of the LV. Once the initial estimate of that region is made, it can be used to estimate a contour or border of the LV. However, several problems have been encountered in applying automated techniques to determine the boundary of the LV in this earlier work. One of the problems appears to be due to inherent differences in the position and orientation of the heart within the image data being analyzed relative to that of hearts in the images comprising the training data. Such differences can affect the accuracy of the initial estimate of the LV region and determination of the contour at ES (and ED), since the differences introduce errors in the classification of pixels of the image data based upon the training data. Clearly, it would be desirable to rotate and translate the training data so that the data are consistent in position and orientation to the LV of the heart being analyzed, prior to using the training data to classify pixels when producing the initial estimate of the LV region.

Another problem identified in the earlier work causes an uncertainty in the automated detection of the border of the LV to arise in the inferior portion of the contour, adjacent to the patient's diaphragm. The gray scale values for the tissue comprising the diaphragm are, for some patients' images, very similar to the gray scale value of injected dye in the images being analyzed. The uncertainty in the automated detection of the border of the LV in the inferior region bordering the diaphragm typically causes the process to define a border that extends outwardly of its actual location, creating an error. Accordingly, the method needs to incorporate a technique for more accurately determining the contour of the LV in this region. This and other problems in the method disclosed in the above-referenced application let to development of the present invention so that the contour of the LV (or other organ) can more accurately be automatically determined.

SUMMARY OF THE INVENTION

In accordance with the present invention, a method is defined for automatically determining a contour of an internal organ in a patient based upon digital image data of a region in which the organ is disposed. The image data represent a sequence of image frames of the region made over an interval of time during which a wall of the organ has completed at least one cycle of movement. The wall of the organ undergoes repetitive cycles of movement as part of the organ's physiological function, and each image frame of the sequence of image frames comprises a plurality of pixels. The method includes the step of developing an initial estimate of a region bounded by the contour of the organ in each image frame of the sequence, based upon a comparison of the image data with parameters derived from training data that were previously produced through manual evaluation of a plurality of image frames over a corresponding cycle for each of a plurality of corresponding organs in other individuals. The parameters derived from the training data are used to assign classes to the pixels comprising each of the image frames of the sequence. The classes indicate pixels that are most likely inside the contour of the organ in each image frame. In the next step, a border of the organ is detected in a portion of the contour where an adjacent tissue mass lying outside the organ interferes with the initial estimate of the region. This step refines the initial estimate of the region bounded by the contour of the organ so that the border of the organ is more accurately defined in the portion of the contour adjacent to the tissue mass.

In the invention, an edge detector technique is used for detecting the border of the organ, producing an edge boundary. The method further includes the step of applying the training data to determine an area adjacent to and outside the portion of the contour, producing a masked region. Next, the masked region is combined with the edge boundary to refine the initial estimate of the region, producing a more accurate contour of the organ at the portion of the contour where the adjacent tissue mass caused the initial estimate to be indefinite. Preferably, dynamic programming is employed to determine how row and column edge components link together to form the edge boundary.

In another step, the border for each image frame is more accurately defined by applying global shape constraints that relate physical shape attributes of the organ to the contour bounding the region.

The step of developing an initial estimate of the region bounded by the contour of the organ in each image frame of the sequence preferably includes the step of estimating a reference location of an associated anatomical feature for the organ of the patient. Either the training data or the image data for the patient are rotated and translated so that a reference location associated with the anatomical feature of the training data is aligned with the reference location associated with the corresponding anatomical feature of the organ in the patient, prior to assigning classes to the pixels to determine the initial estimate of the region. This step ensures that the classes assigned to the pixels, as a function of the training data, are not in error due to differences in the disposition of the patient's heart and those hearts imaged to develop the training data.

To estimate the location of the anatomical feature associated with the organ in each image frame, the following steps are implemented. First, a synthetic image having a maximum contrast relative to a temporally contiguous subset of image frames in the sequence is created by assigning the brightest pixel at each pixel location of the image frames comprising the subset, to each corresponding pixel of the synthetic image. A limited region for the anatomical feature is then determined, based upon the training data, and the limited region is superimposed upon the synthetic image. Boundary regions for the anatomical feature are estimated as a function of gray scale values of the pixels comprising the synthetic image. Within the boundary regions, a boundary for the anatomical feature is estimated, and based upon the boundary estimated for the anatomical feature, a location for the anatomical feature is determined. Preferably, the step of estimating the boundary comprises the step of estimating a center of the anatomical feature. In addition, a gray scale profile is projected along a predetermined angle when estimating the boundary, and as a function of the gray scale profile, limited regions for the contour of the anatomical feature are determined. The predetermined angle is based on an average angle of the anatomical feature in the training data.

A further aspect of the present invention includes the step of developing an initial estimate of the region bounded by the contour of the organ in each image frame of the sequence, but is preceded by the step of aligning a reference location associated with an anatomical feature of the organs represented by the training data with a reference location associated with a corresponding anatomical feature of the organ in the patient, prior to assigning classes to the pixels. Alignment of the reference location associated with the anatomical features for the organ in the patient with that of the training data minimizes errors that may arise due to differences in the disposition of the organ in the patient relative to the organs of the other individuals represented by the training data. This aspect of the invention further includes the step of refining the initial estimate of the contour to more accurately determine the border of the organ in the patient, generally as described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 17:
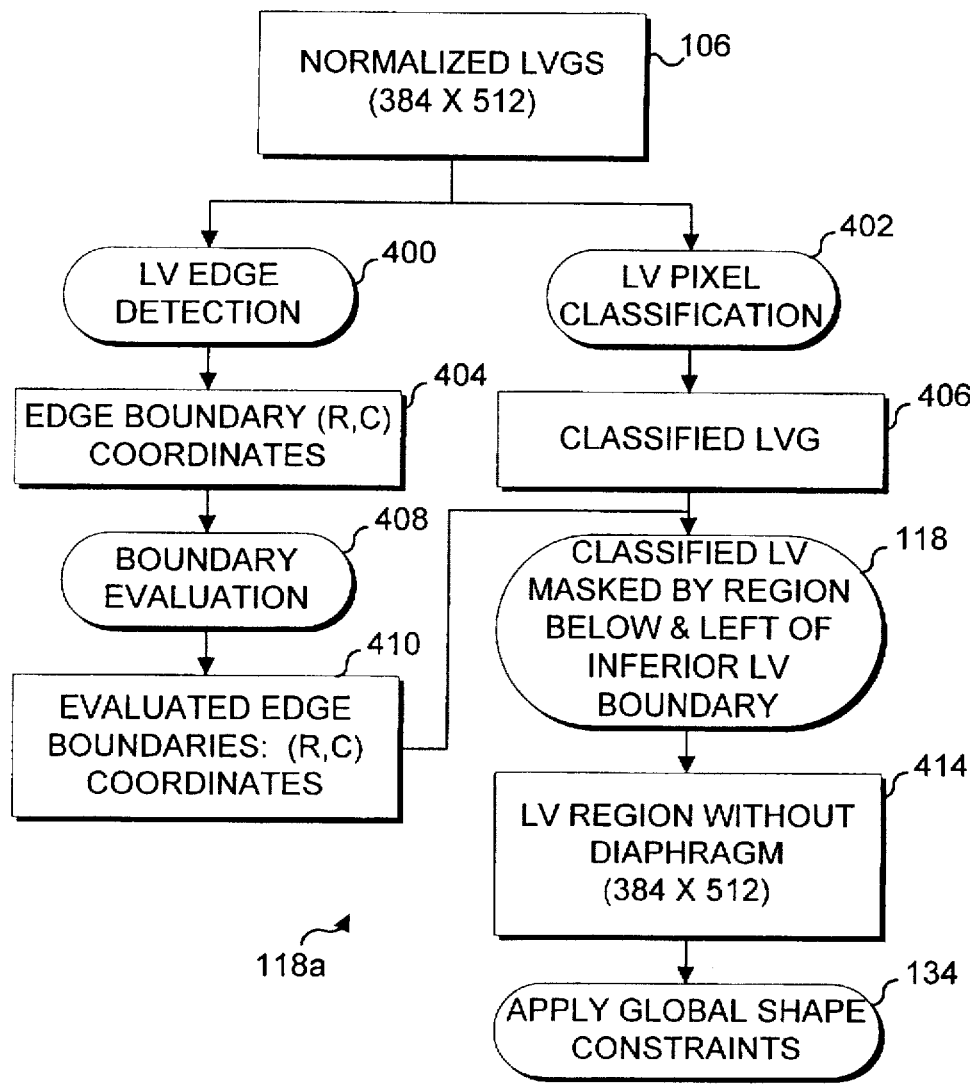
Figure 18:
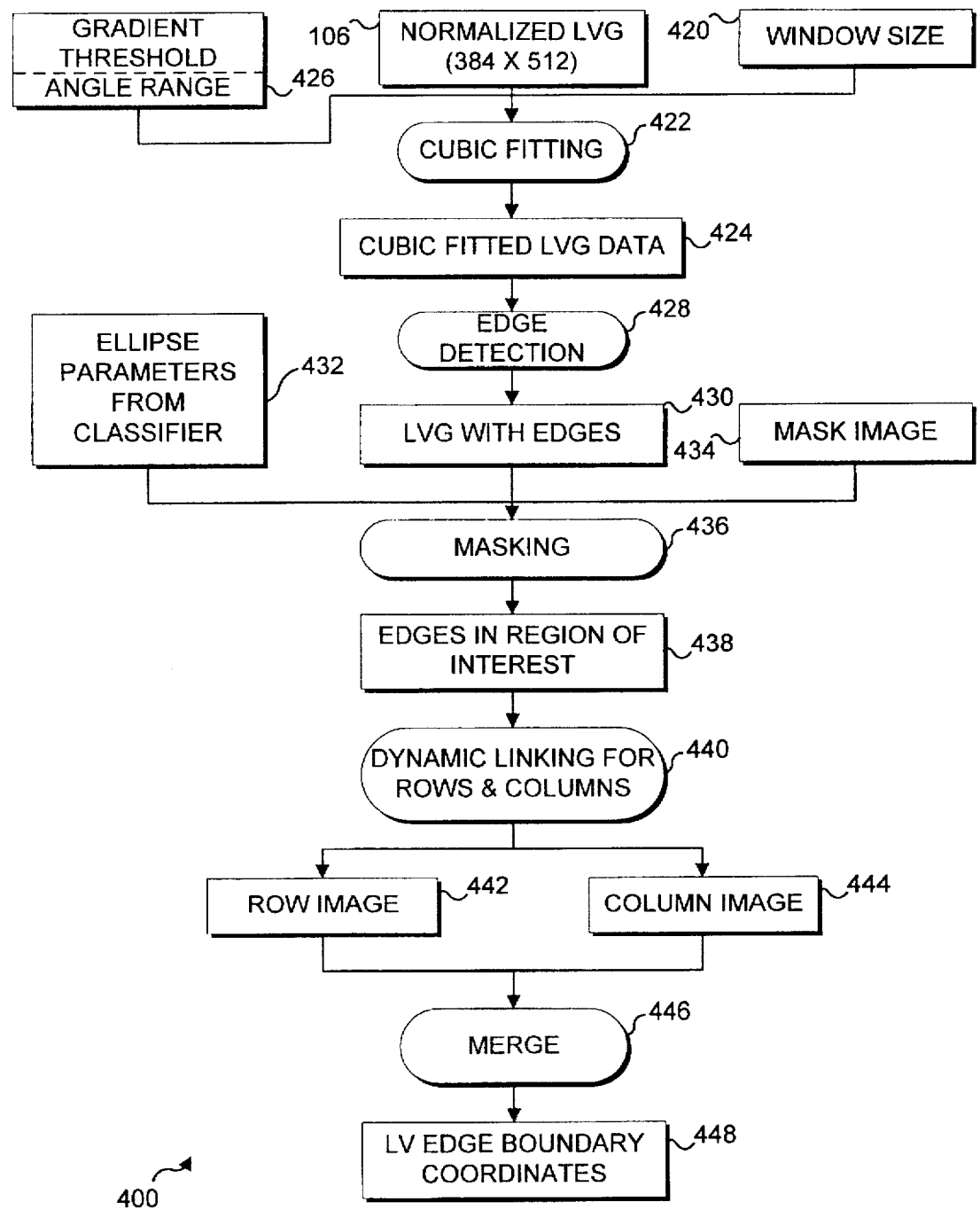
Figure 19:
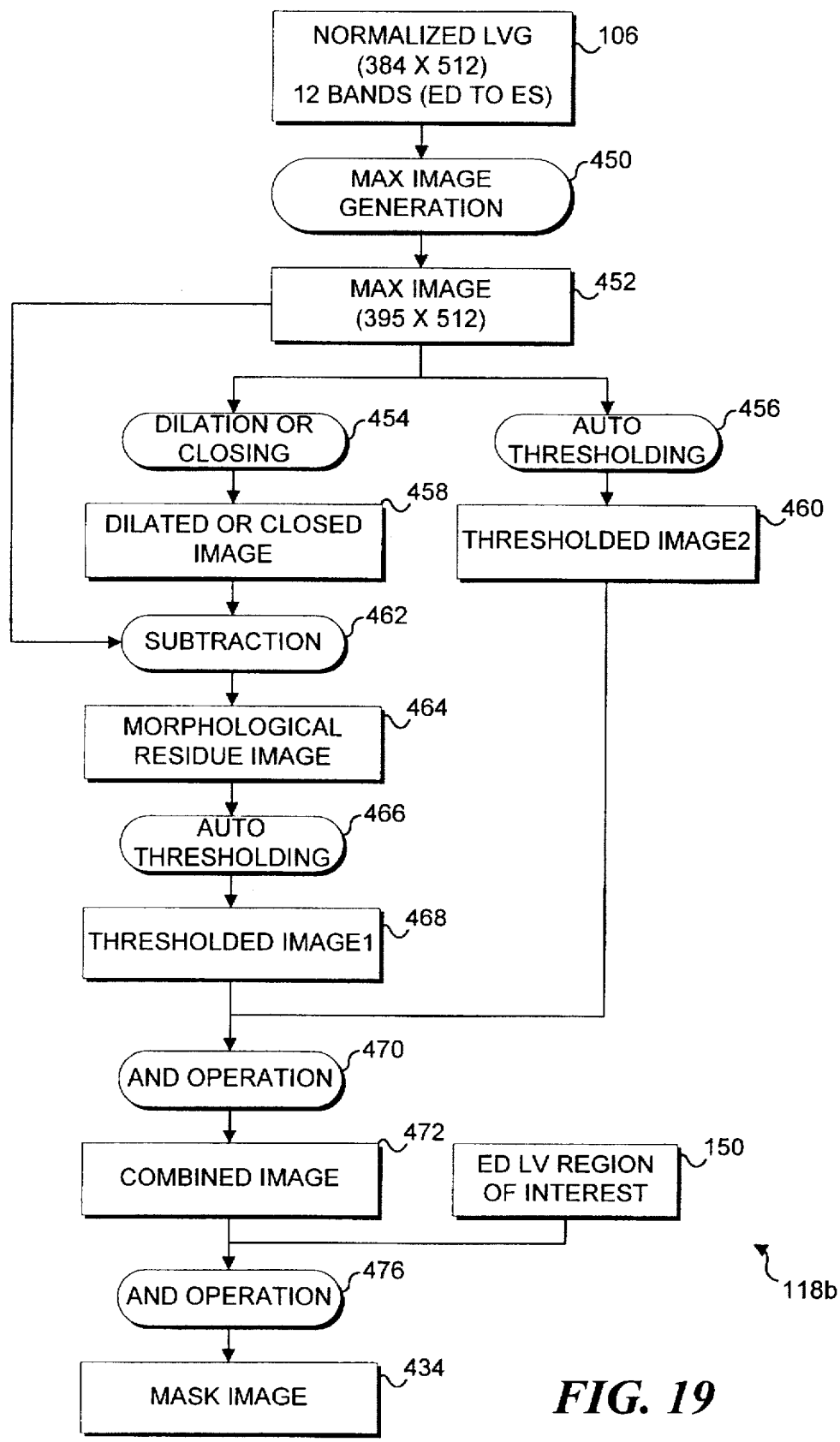
Figures 20, 21:
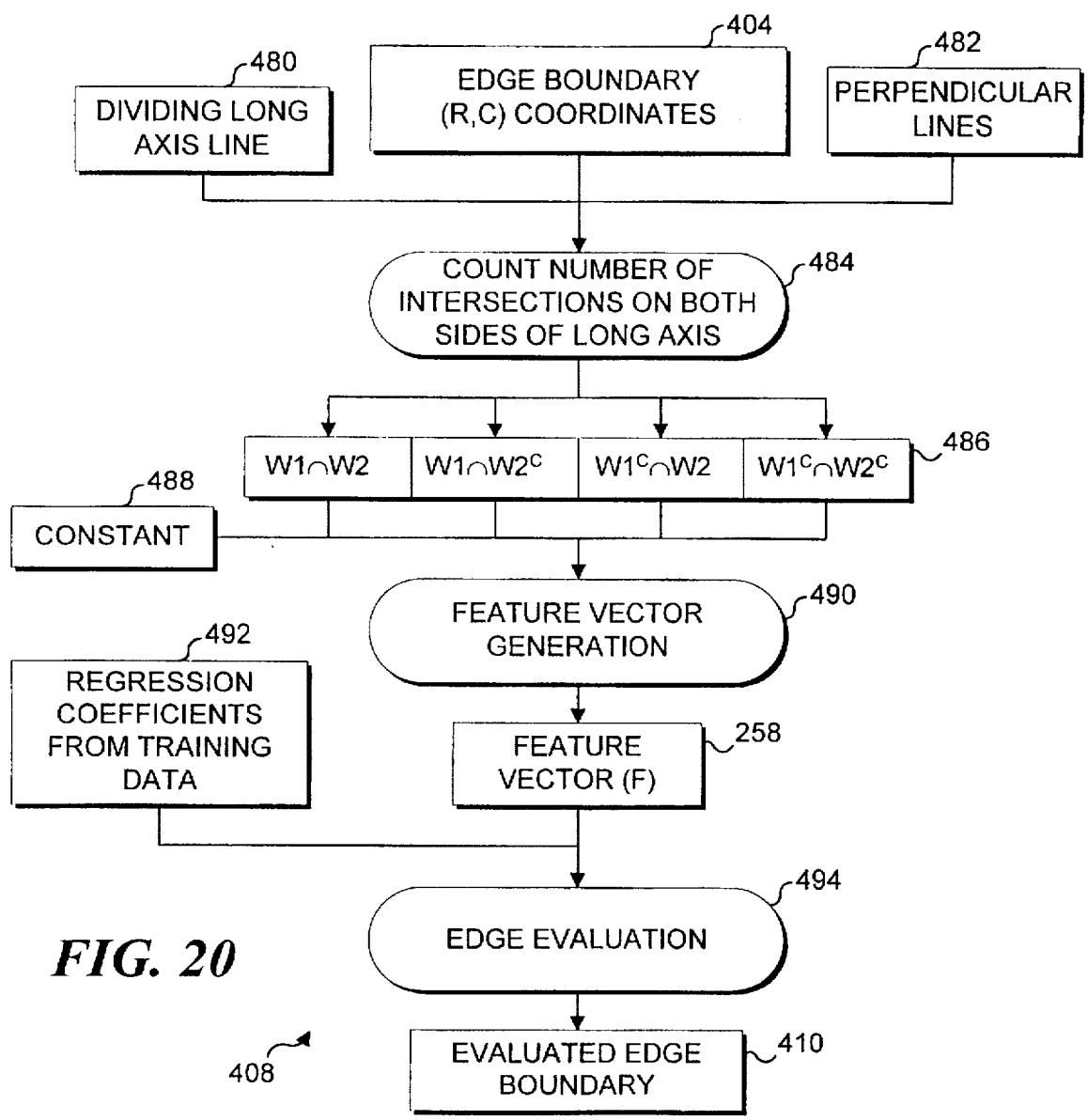

FIG. 15 schematically illustrates how the diaphragm creates a "fuzzy zone" in which the contour of the LV is uncertain and shows the classifier boundary and the ground truth boundary;

FIG. 16A schematically illustrates the borders of the LV based upon the classifier and the LV edge detector, compared to the actual border;

FIG. 16B schematically illustrates a composite border of the LV formed by combining the LV edge border (on the sides) with the classifier border (on the ends) of the LV;

FIG. 17 is a flow chart showing the steps for fusing or compositing the classifier and LV edge boundaries (producing the composite boundary illustrated schematically in FIG. 16B);

FIG. 18 is a flow chart showing the logical steps employed for implementing the LV edge detection technique;

FIG. 19 is a flow chart illustrating the steps for generating a mask image, which is used in the flow chart of FIG. 18;

FIG. 20 is a flow chart showing the steps for evaluating the LV edge; and

FIG. 21 is a flow chart for fusing the edge boundary with the LV classifier boundary.

DESCRIPTION OF THE PREFERRED EMBODIMENT

The Imaging Apparatus

Figure 1:
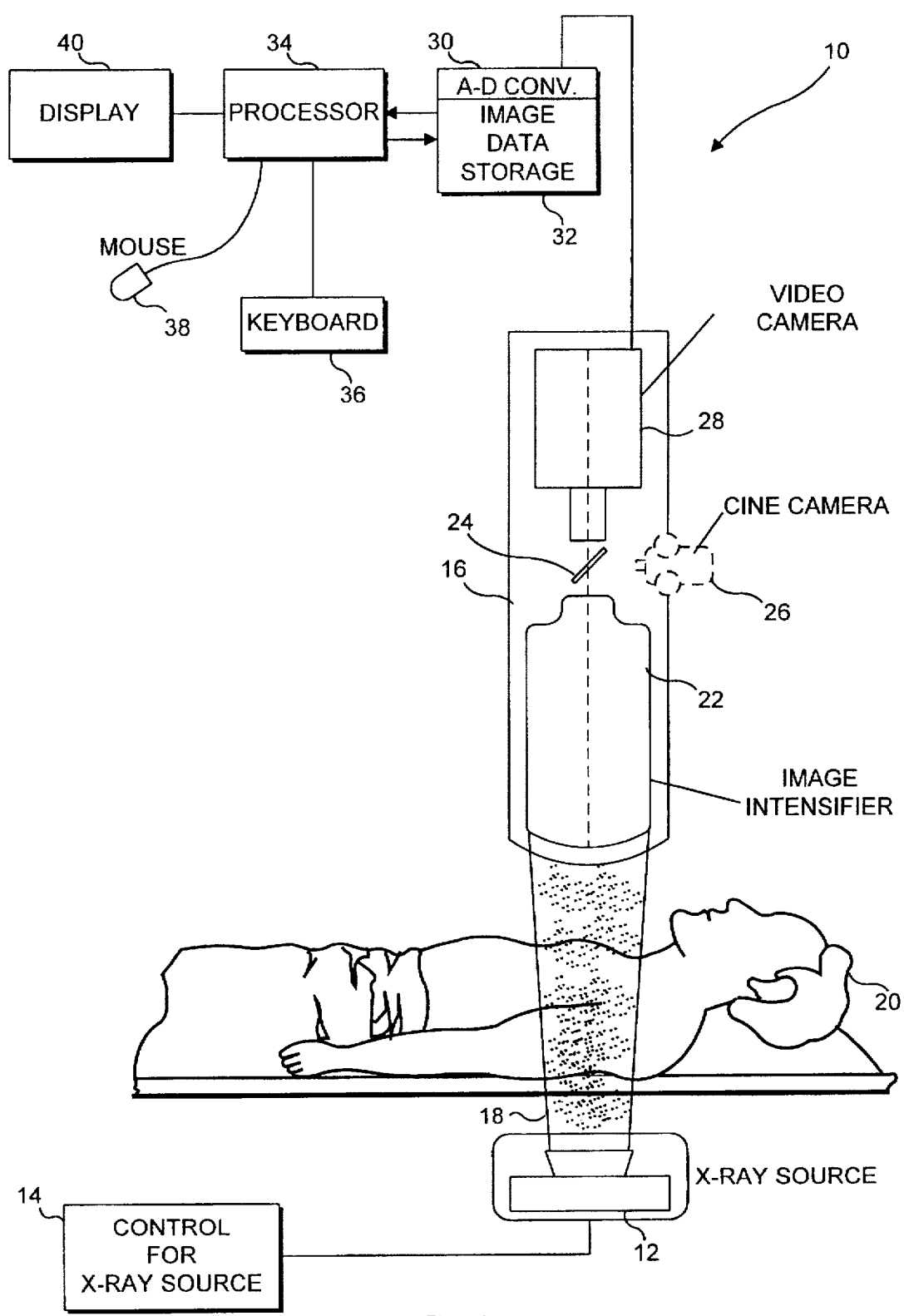
FIG. 1 is a schematic diagram illustrating equipment used to produce X-ray images of an internal organ and the apparatus used for processing the images to determine the contour of the organ in accordance with the present invention.

A generally conventional X-ray imaging facility 10 is shown in FIG. 1. Also shown is the equipment necessary to process the X-ray images produced by the apparatus in accordance with the present invention, so that a contour of an organ can be determined and displayed.

In X-ray imaging facility 10, an X-ray source 12 is energized with electrical current supplied by a control 14, which determines the level of the current, the voltage applied to the X-ray source, and the time interval during which the electrical current is provided. In response to the signals supplied by control 14, X-ray source 12 produces a beam 18 of X-rays that pass through the chest of a patient 20 and into a detector 16. X-ray source 12 and detector 16 are aligned along a common longitudinal axis, so that beam 18 passes through a region of interest in the chest of patient 20. The organ that is being imaged is generally disposed within the center of the region of interest and within the center of beam 18. After passing through the chest of patient 20, beam 18 enters an image intensifier 22 in detector 16, which converts the beam of X-rays into a corresponding optical image.

To more clearly delineate the organ that is disposed in the region of interest from surrounding soft tissue, a radio opaque contrast substance, such as an iodine compound, is injected into the organ, to absorb or block more of the X-ray beam energy than the surrounding soft tissue. As a result, the interior of the organ in the image produced by image intensifier 22 appears relatively brighter, compared to the surrounding background. A partially silvered mirror 24 is disposed along the longitudinal axis of detector 16, so that a portion of the light comprising the image produced by image intensifier 22 is reflected in a direction transverse to the longitudinal axis of the detector and into the lens of a cine camera 26 (optional). The remainder of the light comprising the image is transmitted through partially silvered mirror 24 along the longitudinal axis of detector 16 and into the lens of a video camera 28.

In the illustrated embodiment, video camera 28 produces an analog signal resulting from scanning the image produced by image intensifier 22. Alternatively, the images produced by image intensifier 22 can be projected into a video camera (not shown) that is external to the detector. The analog signal comprises a voltage for each pixel of the image, the value of which is indicative of a gray scale value or intensity level at the pixel. The analog signal is input to an analog-to-digital converter (ADC) 30, which converts the voltage representing the gray scale value for each pixel to a corresponding digital value. It should be noted that certain types of video cameras are able to directly produce a digital output signal, and if such a video camera is used, ADC 30 can be eliminated.

In the preferred embodiment, the gray scale level can range between 0 and 255 for any pixel in the digital image data (but in fact, the darkest and brightest pixels may encompass a much smaller range). It should also be noted that the digital image data produced by the X-ray facility at each spaced-apart interval of time is referred to throughout this specification and in the claims as an "image frame." Further, in the preferred embodiment, a plurality of image frames depicting the organ at spaced-apart times are produced by setting control 14 so that X-ray source 12 is repetitively, briefly energized. In the exemplary application of the present invention discussed below, the region of interest imaged by beam 18 includes the heart of patient 20, and more specifically, the left ventricle (LV) of the heart. By processing a sequence of digital image frames of the LV that have been made over at least one cardiac cycle, the preferred embodiment of the present invention automatically determines the contour of the endocardial surface of the LV at multiple times during the cardiac cycle. It is most useful to determine the contour at end diastole (ED) and at end systole (ES).

The digital image data for each of the image frames is stored in an image data storage device 32, which preferably comprises a large capacity hard drive or other non-volatile storage media. Image data storage device 32 is coupled bi-directionally to a processor 34, which preferably comprises a desktop personal computer, or a work station. A keyboard 36 and a mouse 38 (or other pointing device) are coupled to processor 34 to enable the operator to input data and/or instructions used for controlling the software running on processor 34. This software is used to implement the method of the present invention, which enables the digital image data stored as image frames in image data storage device 32 to be processed to produce a contour of the LV at different times during the cardiac cycle. The contour of the LV in an image frame that is thus automatically determined by the method is presented to the user on a display 40, which is coupled to processor 34. In addition, data defining the contour determined by processor 34 can optionally be stored in image data storage device 32, for later analysis and evaluation.

Object of the Method

Figure 2:
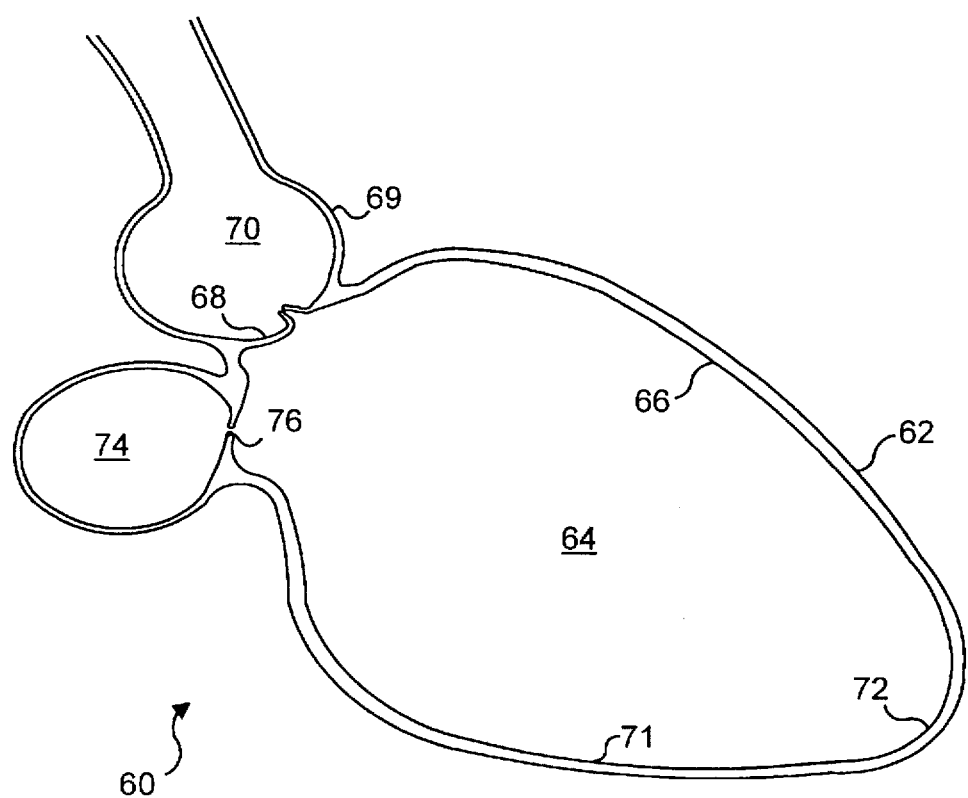
FIG. 2 is cross-sectional view of a human heart, illustrating the shape of the LV.

Referring now to FIG. 2, a cross-sectional view of a portion of a human heart 60 corresponding to a projection angle typically used for recording ventriculograms has a shape defined by its outer surface 62. Prior to imaging a LV 64 of heart 60, the radio opaque contrast material is injected into the LV so that the plurality of image frames produced using the X-ray apparatus include a relatively bright area within LV 64. However, those of ordinary skill in the art will appreciate that in X-ray images of the LV, the bright silhouette bounded by the contour of an endocardium (or inner surface) 66 of LV 64 is not clearly delineated. The present method processes the image frames produced with the X-ray source to obtain a contour for each image frame that closely approximates the endocardium of the patient's LV.

It should be noted that although image frames produced using an X-ray source are disclosed as the type of image data processed in the preferred embodiment of this invention, the present method is also applicable to processing other image data from other sources, including ultrasound and nuclear magnetic resonance image data. The image frames produced by any of these techniques are difficult to interpret to determine the contour of the LV, since the contour of the LV (or of any other organ being examined using these imaging techniques) is typically not clearly delineated. With regard to the LV as the exemplary organ of interest, the lower left portion of the contour, i.e., an inferior border 71 disposed left of an apex 72, characteristically appears with much less clarity than the upper portion of the LV. The upper portion of the LV is disposed adjacent aortic valve 68, which opens into aorta 70, and mitral valve 76, which opens into part of left atrium 74. The poor contrast of the inferior portion of the LV contour is primarily due to the proximity of the diaphragm, as explained further below.

During the cardiac cycle, the shape of LV 64 varies and its cross-sectional area changes from a maximum at end diastole, to a minimum at end systole. The cross-sectional area and the shape defined by the contour of the endocardium surface change during this cycle as portions of the wall of the heart contract and expand. By evaluating the changes in the contour of the LV from image frame to image frame over one or more cardiac cycles, a physician can diagnose organic problems in the patient's heart, such as a leaking mitral valve or a weakened myocardium (muscle) along a portion of the wall of the LV. These physiological dysfunctions of the heart are more readily apparent to a physician provided with contours of the heart over the cardiac cycle. The physician is alerted to a possible problem if the contour does not change shape from frame to frame in a manner consistent with the functioning of a normal heart. For example, if a portion of the LV wall includes a weakened muscle, the condition will be evident to a physician studying the relative changes in the contour of the LV in that portion of the wall, compared to other portions, since the portion of the endocardium comprising the weakened muscle will fail to contract over several image frames during systole in a normal and vigorous manner. Similarly, over multiple cardiac cycles, valve leakage will be evident from an evaluation of the contours. At the very least, physicians are interested in comparing the contours of the LV at ED versus ES. Thus, a primary emphasis of the present invention is in automatically determining the contour of the LV within the ED and ES image frames, although the contour can automatically be determined for other image frames in the same manner.

The capability to automatically determine the contour of the LV immediately after the images are acquired can enable a physician to more readily evaluate the condition of the heart during related medical procedures. It is expected that the present method should produce contours of the LV or other chamber of the heart (or other organ) during one or more cardiac cycles, with an accuracy at least equal to that of an expert in evaluating such images, and should accomplish this task substantially faster than a human expert. Moreover, the present invention ensures that the contour is accurately determined by relating a position and orientation of the patient's heart in the image data to an anatomical feature, namely, the aortic valve plane. In addition, the present invention provides a more accurate determination of the contour adjacent to tissue such as the diaphragm, which tends to interfere with the automated process in determining the contour in the portion adjacent to the tissue.

Overview of the Method

Figure 3:
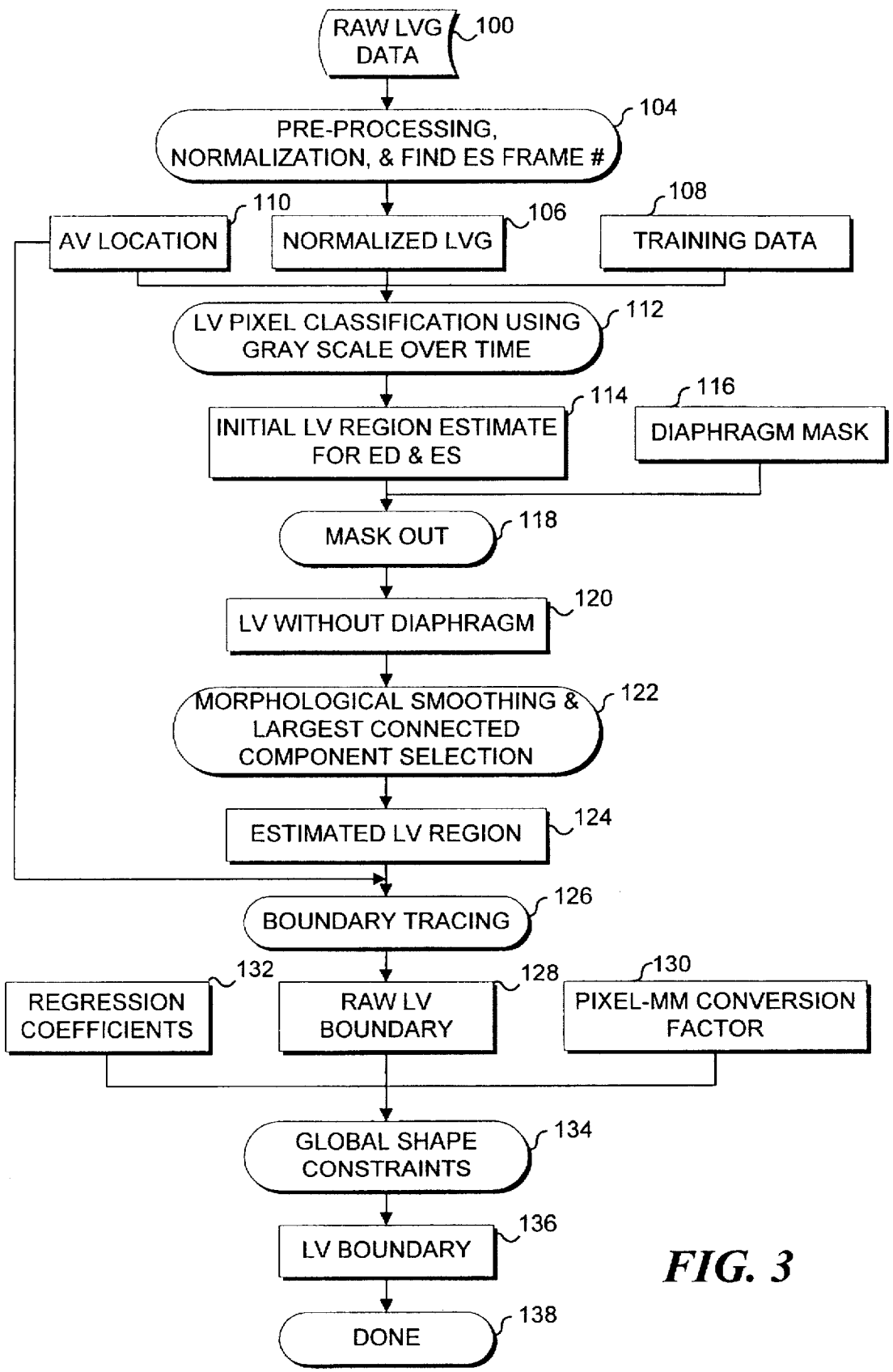
FIG. 3 is flow chart showing an overview of the process steps employed in the present invention to determine the contour of a LV, at multiple times over a cardiac cycle.

An overview of the steps involved in automatically determining the contour of the LV is shown in FIG. 3. As explained above, the sequence of digital image frames comprises the input for the process that is used to determine the contour of the LV. The input data are referred to as raw left ventriculogram (LVG) data 100. The raw LVG data are input to a block 104 in which pre-processing, normalization, and ES frame number estimation are implemented. This process produces normalized LVG data 106. An aortic valve (AV) location 110 for the imaging data currently being analyzed, i.e., for patient 20, and training data 108 are input with the normalized LVG data to a block 112 for use in classifying LV pixels in the image frames being processed, based on the gray scale levels of each of the pixels comprising the images, over at least one cardiac cycle. The classification of the LV pixels to determine an initial estimate of the LV region is implemented using training data that has been rotated and translated as necessary so that the LVs represented by the training data are generally aligned with the LV represented by the raw LVG data. As explained below, the aortic valve plane is used as a reference to align the LVs in the training data with the LV in the normalized LVG data. In a block 114, an initial estimate of the LV region of patient 20 at ED and at ES is provided. This initial estimate is a function of the gray scale values for each pixel in the image frames during systole, i.e., the part of the heart cycle when the heart is contracting, from ED to ES. To form the initial estimates of the LV region, each pixel in the ED and ES image frames is classified as a function of its location and of the gray scale values that it had in successive image frames in systole, by reference to parameters that have previously been determined through manual evaluation of the training data. As noted above, the training data are image data that were produced by imaging the LVs in the hearts of a plurality of other individuals. By classifying each of the pixels in each image frame for the patient as being inside the LV contour or outside at the time the cardiac cycle corresponding to that image frame, the initial estimate of the LV region of the patient's heart is produced.

A diaphragm mask 116 is supplied to a block 118, along with the initial LV region estimate for ED and ES, so that a procedure can be applied to mask out the effect of the diaphragm in determining the contour of the lower left or inferior portion of the LV contour in the ED and ES image frames. This step produces an LV contour in each of these image frames that is without the effect of the diaphragm, as indicated in a block 120. In carrying out this step, much of the uncertainty of the boundary of the LV caused by the proximity of the diaphragm and the concomitant error in the initial estimate of the LV region is eliminated.

Typically, the initial estimate of the LV region is discontinuous, i.e., discrete patches of the region may appear in the image frame. A procedure for morphologically smoothing and selecting the largest connected components is applied, as indicated in a block 122, to deal with such discontinuities. This procedure yields an estimated LV region in a block 124 from which such discontinuous areas are generally eliminated. A block 126 provides for tracing the boundary of the estimated LV region, producing a raw LV boundary 128. When tracing the boundary, the program produces a continuous estimated contour (i.e., the classifier boundary) that extends from one point on the aortic valve plane, around the LV region to another point on the aortic valve plane. Regression coefficients 132, which are derived from the training data, and a pixel-mm conversion factor 130 are input with the raw LV boundary for the ED and ES image frames, to a block 134, in which global shape constraints are applied. The pixel-mm conversion factor relates the raw LV boundary data to an absolute size standard image produced when the imaging of the patient was done. The conversion factor is determined from the image of the size standard, which may comprise a grid of known dimensions or a sphere made of aluminum or other metal and having a known size. By comparing the apparent size of the grid or sphere in the image with the known size of the standard, a conversion factor can be determined that can be applied to the raw LV boundary data to convert it to an absolute size.

In block 134, global shape constraints are applied to determine the portion of the contour of the LV in the ED and ES image frames at the apical region as a function of the remaining portion of the contour. This step uses global shape constraints that are based on the previously collected training data. The manually determined contours for the LV in other hearts are evaluated to determine the relationship between the upper two-thirds of the LV contours and the portions of the contours proximate to the apex. By using this relationship to evaluate the raw LV boundary from block 128, the global shape constraints in block 134 produce an estimated LV boundary 136. The procedure then terminates by presenting the LV boundary, e.g., as a display on a computer monitor (not shown), to a medical practitioner, as indicated by a block 138.

Details of the Method

The location of each pixel in an image frame sequence is determined by its row and column coordinates. A vector of gray scale values for each pixel through the entire image frame sequence is associated with each row/column position. The present method employs a "feature vector" for each pixel, which is the pixel's vector of gray scale values throughout the sequence, with added elements indicating its row/column position, and its distance from the center of the region of interest. The training data establish a set of feature vectors for each class. In the preferred embodiment, the training data are normalized to provide 12 image frames for systole.

Figure 5:
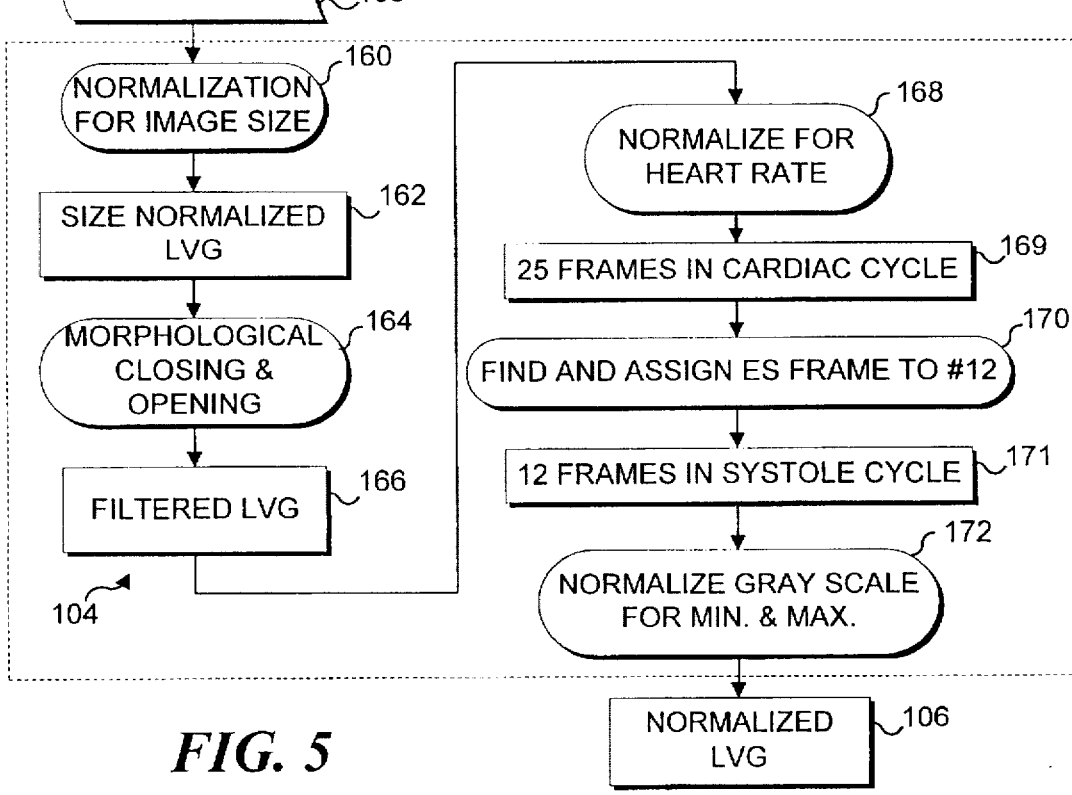
FIG. 5 is a flow chart illustrating the steps used for preprocessing and normalizing the image data for a patient.

Details of the procedure for pre-processing, normalization, and finding the ES frame number indicated in block 104 of FIG. 3 are illustrated in FIG. 5. Raw LVG data 100 are normalized so that they are of the same image size, as indicated in a step 160. In the preferred embodiment, each image frame is normalized to a resolution of 384×512 pixels, the pixels are square (not rectangular), and the image sequence begins with a frame at ED and ends at the following ED image frame. The resulting size normalized LVG data in a block 162 are input to a morphological closing and opening procedure in a block 164; this step is a filtering process, producing filtered LVG data 166. The filtered LVG data are input to a procedure for normalizing the LVG data for the heart rate of the patient, as indicated in a block 168. It should be noted that different numbers of image frames may have been produced within one cardiac cycle, depending upon the heart rate of the patient. This step produces output data normalized to provide for 25 frames in the cardiac cycle, as indicated in a block 169. In a block 170, a procedure is applied (described below) to find the ES frame, which is assigned to frame number 12, insuring that there are 12 frames in the systole cycle, as indicated by a block 171. Finally, a procedure in a block 172 provides for normalizing the 12 frames in the systole cycle so that the gray scale values of their pixels all fall between predetermined minimum and maximum values. The output of the process in block 172 is normalized LVG data 106.

Figure 11:
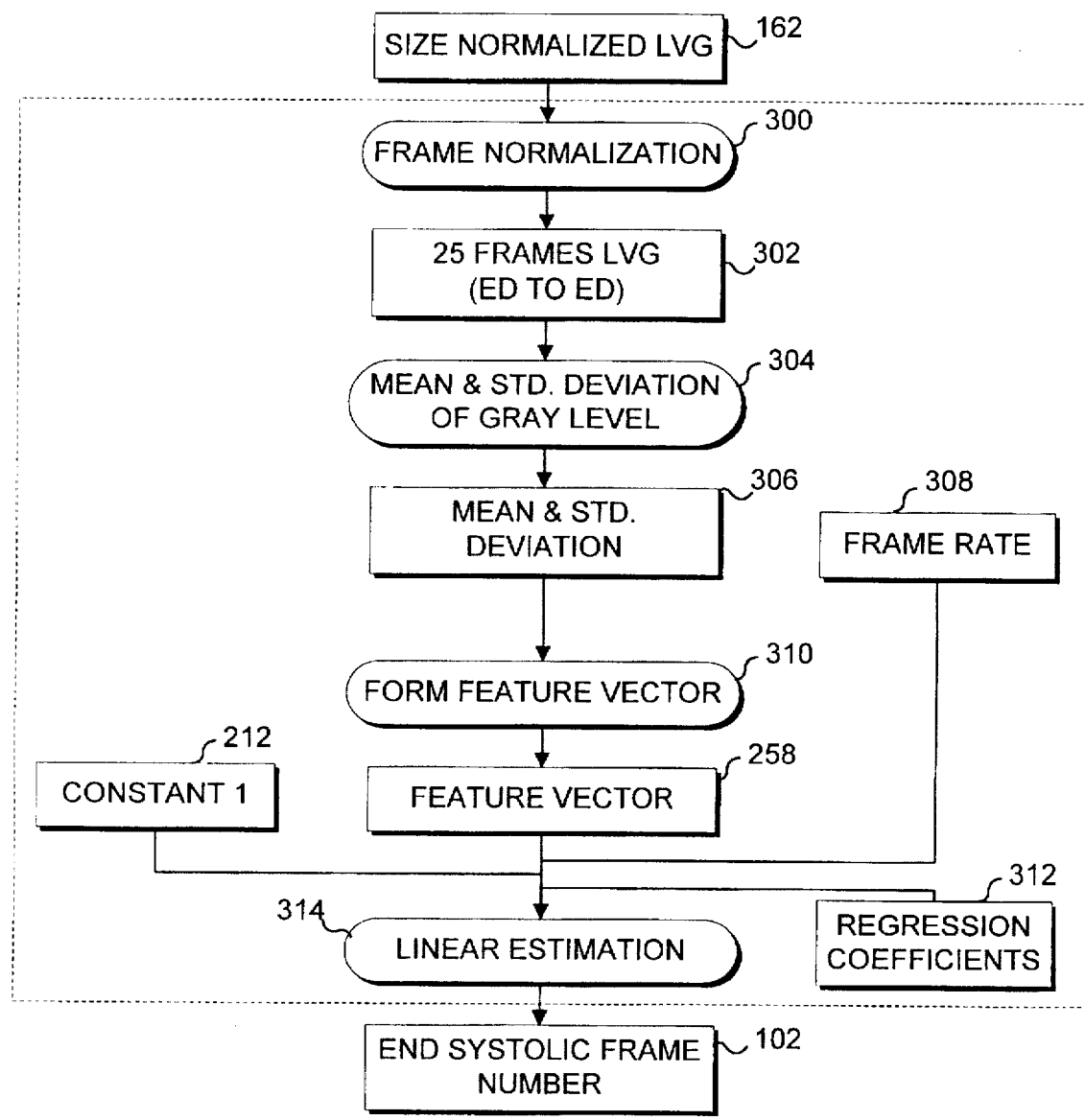
FIG. 11 is a flow chart showing the steps used for identifying the end systolic frame from among the image frames comprising a cardiac cycle.

Although the end systole frame could be manually determined, the ES frame number is preferably automatically determined. The steps for automatically determining the ES frame number are illustrated in FIG. 11. The size normalized LVG data in block 162 serve as an input to a block 300 that provides for frame normalization of the data. Alternatively, the filtered LVG data from block 166 in FIG. 5 could be used as an input to block 300 in FIG. 11. The frame normalization produces 25 frames of LVG data covering one cardiac cycle, i.e., from ED to ED, as indicated in a block 302. Next, in a block 304 the mean and standard deviation of the gray scale values are determined for each of the 25 frames, yielding mean and standard deviation data 306. The mean and standard deviation data in block 306 are used in a block 310 to form a feature vector 258. Regression coefficients 312, the feature vector, a constant 1 from block 212, and a frame rate variable 308 are then employed in a linear estimation in a block 314, to determine the ES frame number in block 102.

Figure 6:
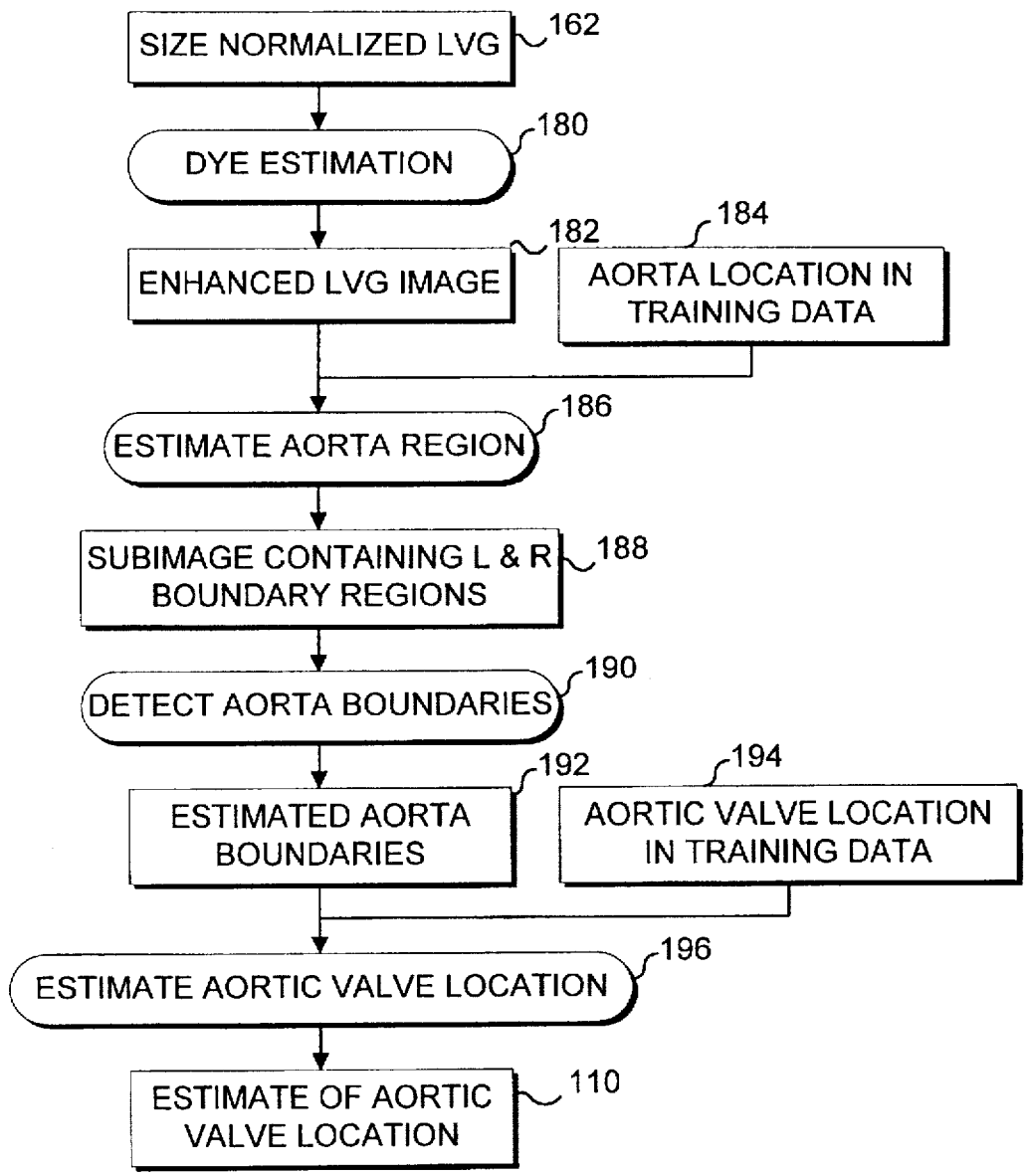
FIG. 6 is a flow chart illustrating the steps employed in estimating the left ventricular aortic valve location in the images of the patient's heart.

An important aspect of the present invention is the automatic determination of the location of the aortic valve (or more specifically, the aortic valve plane) as a reference for alignment of the training data with the image data for the patient. Details of the procedure used by the present invention for automatically determining the location of the aortic valve for the patient are illustrated in FIG. 6. Size normalized LVG data, as indicated in block 162, are supplied as an input to a dye estimation procedure in a block 180. The dye estimation procedure examines a subset of image frames of the patient that are temporally adjacent to ED or to ES, for example in image frames immediately preceding, at, and immediately following ED or ES, and for each pixel position in the subset of image frames, selects the brightest gray scale value for assignment to a corresponding pixel to create an enhanced LVG image 182. In this manner, enhanced LVG image 182 is synthesized, and it includes the brightest pixel from each of the corresponding pixels in the subset of image frames comprising the sequence made for patient 20. The enhanced LVG image and training data in which the aorta location in the hearts of the other individuals has been manually drawn, represented by a block 184, are used to estimate the aorta region, as indicated in a block 186.

Figure 7:
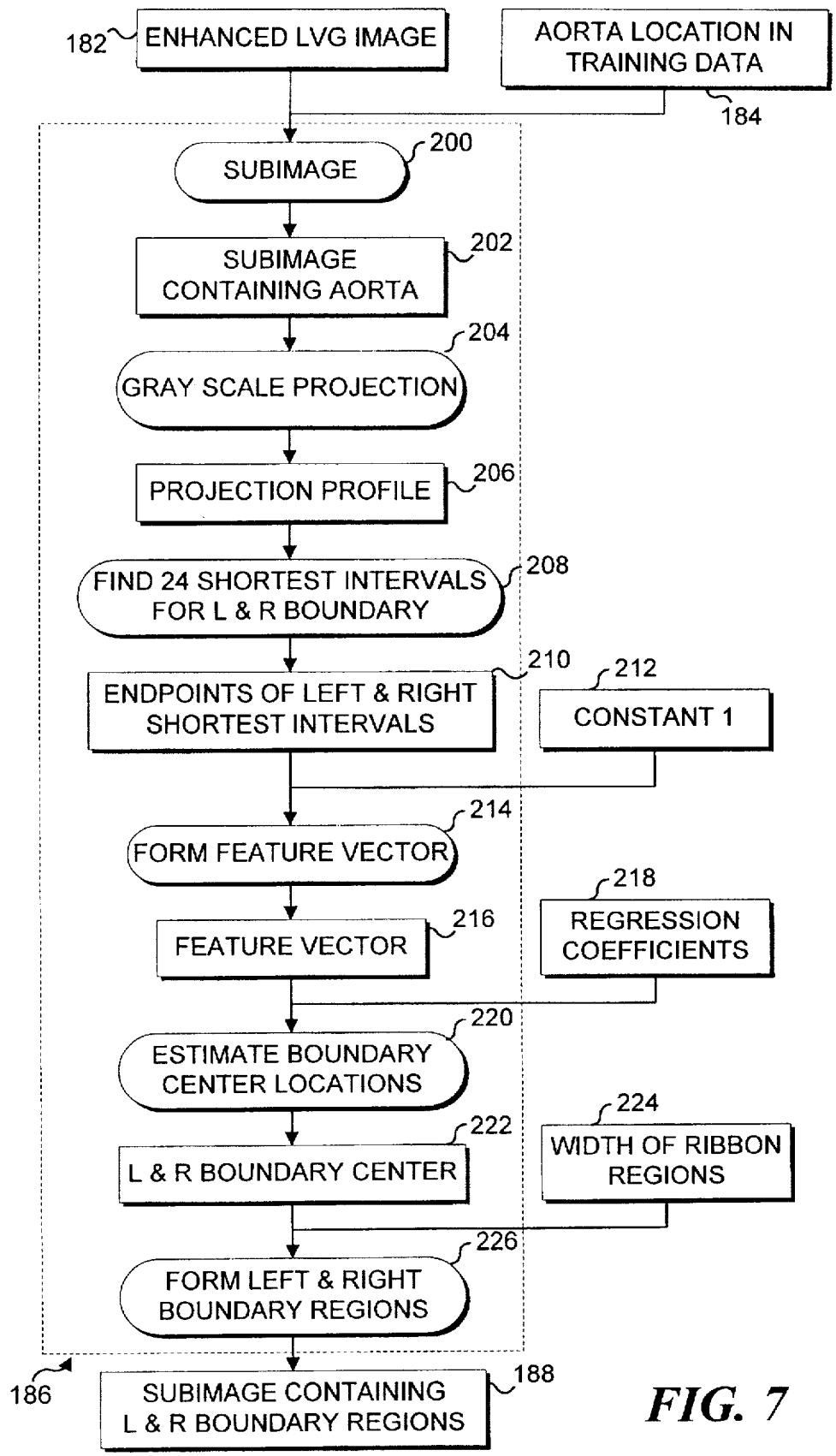
FIG. 7 is a flow chart illustrating the logic used to estimate the aorta region in the images of the patient's heart.

Details of the procedure for estimating the aorta region are illustrated in FIG. 7. The manually drawn aorta contours from the training data are overlaid in one image to define a minimum-size rectangle that just encompasses all of the contours. This minimum-size rectangle is then overlaid on the enhanced LVG image from block 182 in a block 200 to define a subimage 202 having a very high probability of containing the aorta. This subimage thus defines a general region of interest within the enhanced LVG image.

Figure 12:
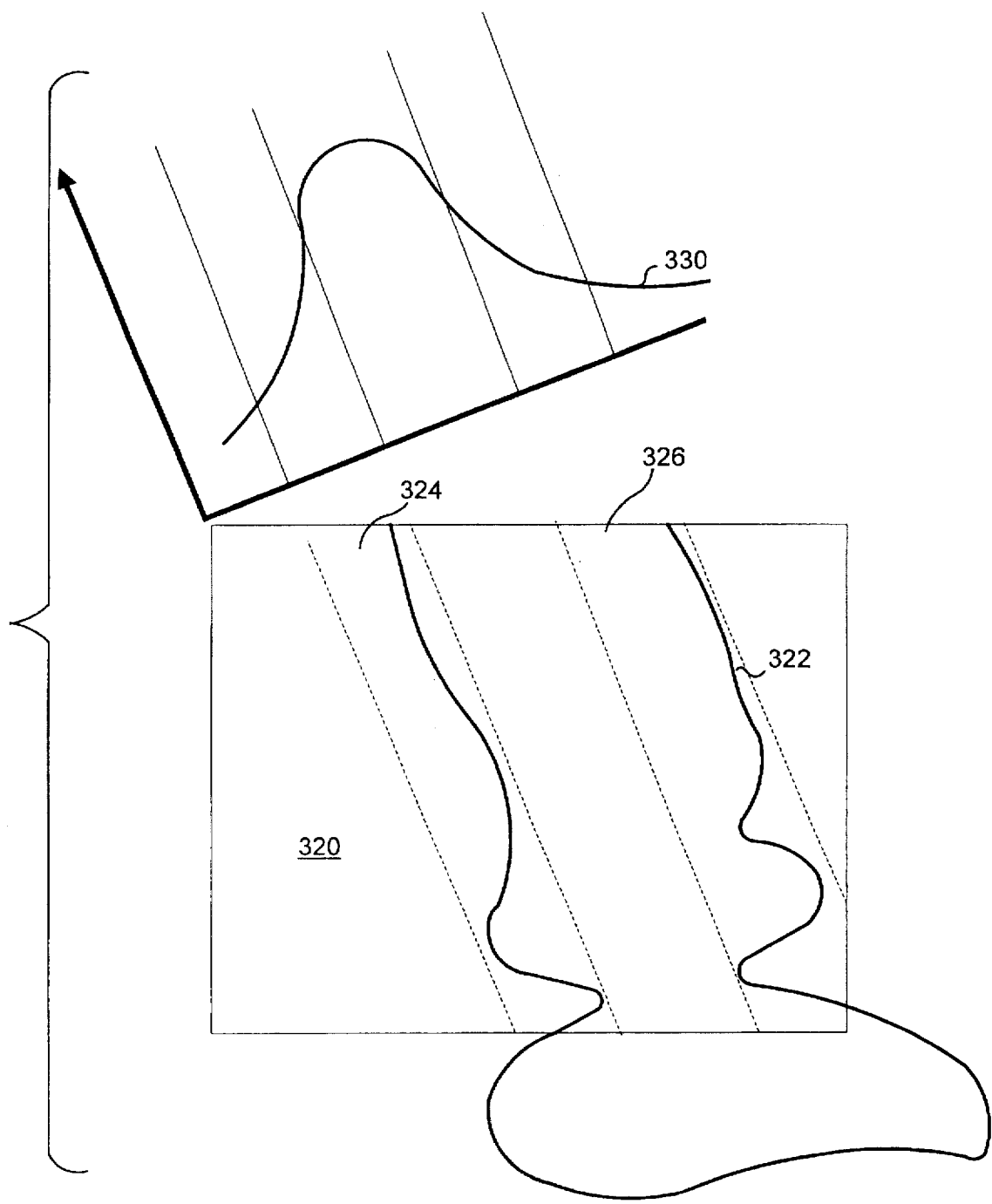
FIG. 12 is a representation of the aorta region, showing how the gray scale values in the region are projected onto a graph and illustrating two tilted rectangles that encompass opposite sides of the aorta.

In FIG. 12, an exemplary general region of interest 320 is shown to encompass an aorta 322. Reference should be made to FIG. 12 to better understand the following explanation of the procedure used for estimating the aorta region in block 186 of FIG. 6. The subimage containing the aorta, which is referenced in block 202 of FIG. 7, corresponds to general region of interest 320 in FIG. 12. As shown in the example of FIG. 12, gray scale values for the enhanced LVG image are projected along a predefined angle, which is selected to produce a graph 330 of gray scale values, i.e., a gray scale projection profile, as indicated in a block 204 of FIG. 7. Each value on this profile represents the summation of the gray scale values for all pixels lying on the corresponding projection line. The predefined angle is selected to produce a gray scale projection profile in which the peak is narrower than at other angles. In the preferred embodiment, the predefined angle is 22°, measured counterclockwise from vertical. Projection profile 206 in FIG. 7 corresponds to graph 330 in FIG. 12.

Returning to FIG. 7, next, in a block 208, a procedure is applied to define 24 shortest intervals for the left and right boundary of the aorta in the enhanced LVG image. The purpose of this step is to use the projection profile data to assist in locating the left and right aorta boundaries. Each of the 24 intervals of projection profile 206 is the shortest interval, of the distance from left to right, that contains a percentage P of the area under the profile. In the preferred embodiment, P ranges from 10% to 80% in steps of 3%. This procedure yields the left and right endpoints of the 24 shortest intervals, as indicated in a block 210. A constant value of 1 is then included with the endpoints defining these intervals, as indicated in a block 212, to form a feature vector 216, as noted in a block 214. Feature vector 216 and regression coefficients 218 are employed to estimate a center of the interval of projection profile 206 that corresponds to a left aorta boundary, and a center corresponding to a right aorta boundary, as provided in a block 220 (see graph 330 in FIG. 12). The step in block 220 yields left and right boundary centers 222. The widths of ribbon regions in a block 224 for the left and right aorta boundaries are determined from the training data as the maximum width of the projection profile for each boundary. The estimated left and right aorta centers 222 and the widths of the ribbon regions 224 are used in a procedure referenced in a block 226 to form the left and right boundary regions. These boundary regions correspond to tilted rectangles 324 and 326 in FIG. 12, which are tilted at the preferred angle of 22°. The subimage containing the tilted rectangles defining the left and right boundary regions are returned in a block 188. In FIG. 12, it will be noted that a boundary 322 of the aorta lies within tilted rectangles 324 and 326.

Figure 8:
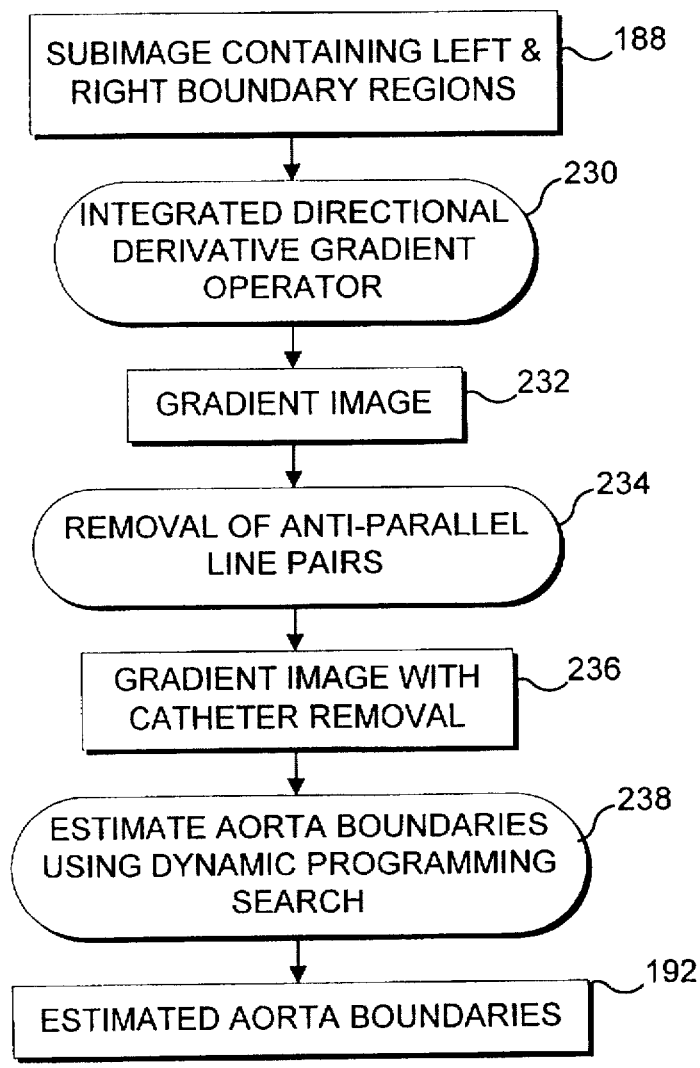
FIG. 8 is a flow chart that includes steps employed for detecting the aorta boundary in the images of the patient's heart.
Figure 13:
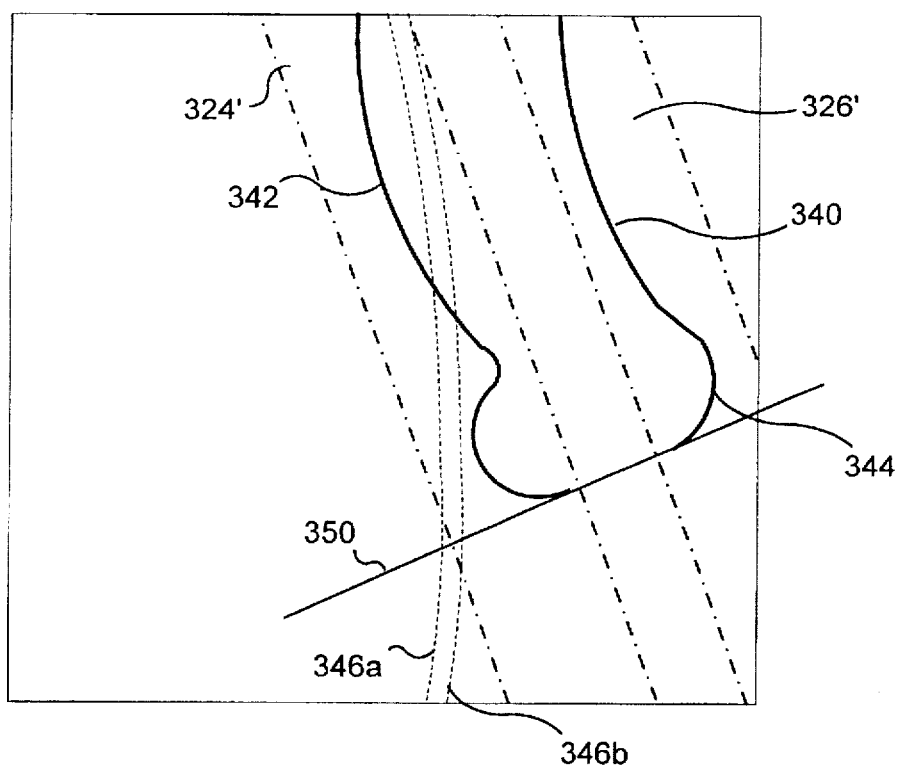
FIG. 13 is a further view of the tilted rectangles, the sides of the aorta, and an image of a catheter in the aorta region.

Referring back to FIG. 6, a procedure in a block 190 provides for detecting the aorta boundaries using the subimage containing the left and right boundary regions of block 188. Details for this procedure are illustrated in FIG. 8. Turning to FIG. 8, the subimage containing the left and right boundary regions is processed by an integrated directional derivative gradient operator, as indicated in a block 230. This operator produces a gradient image 232 that is used in a procedure indicated in a block 234 for removing anti-parallel line pairs. The purpose of this step is to delete lines caused by a catheter (or by any other non-anatomical structure having parallel edges) from the left and right boundary regions in the gradient image. Edges of the catheter appear in the gradient image as two parallel lines. The term "anti-parallel" refers to the fact that the gradients used to generate the lines along the edges of a catheter run in opposite directions. Referring to FIG. 13, anti-parallel lines 346a and 346b are illustrated as representative of the kinds of lines that are removed from the gradient image. (In FIG. 13, tilted rectangles 324' and 326' encompass an aorta boundary 340, and anti-parallel lines 346a and 346b extend into tilted rectangle 324'.) The result, indicated in FIG. 8, is a gradient image in which the catheter has been removed, as indicated in a block 236. From this gradient image, an estimate of the aorta boundaries is made using a dynamic programming search, in accord with a block 238 in FIG. 8. This procedure searches a predefined neighborhood of pixels around any edge appearing in the gradient image and determines which neighboring pixels are likely to lie along a border of the aorta. The dynamic programming search could be conducted row by row in the gradient image from which the catheter has been removed, but better results are obtained by doing the search parallel to the angle (22°) at which the left and right boundary regions are tilted. The results of the dynamic programming search are estimated aorta boundaries 192.

Figure 9:
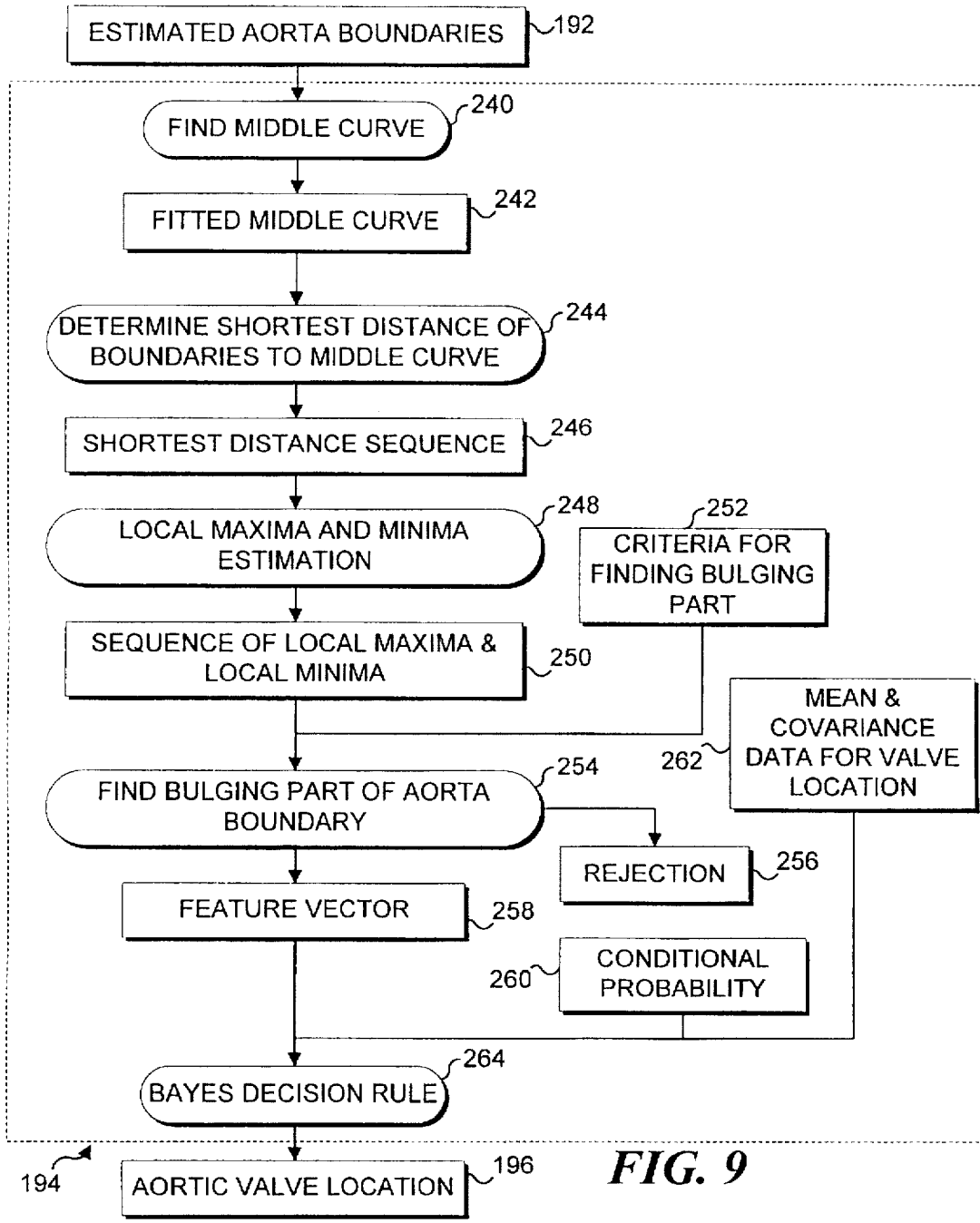
FIG. 9 is a flow chart showing the steps for estimating the aortic valve location.

Again referring back to FIG. 6, estimated aorta boundaries 192, and as provided in a block 194, training data in which the aortic valve location is manually defined are applied to a procedure in a block 196. This procedure estimates the aortic valve location as a function of the estimated aorta boundaries. Details of this procedure are illustrated in FIG. 9. In FIG. 9, the first step in a block 240 finds a fitted middle curve 242 or centerline through the aorta using the estimated aorta boundaries. Details of the step recited in block 240 are provided in FIG. 10.

Figure 10:
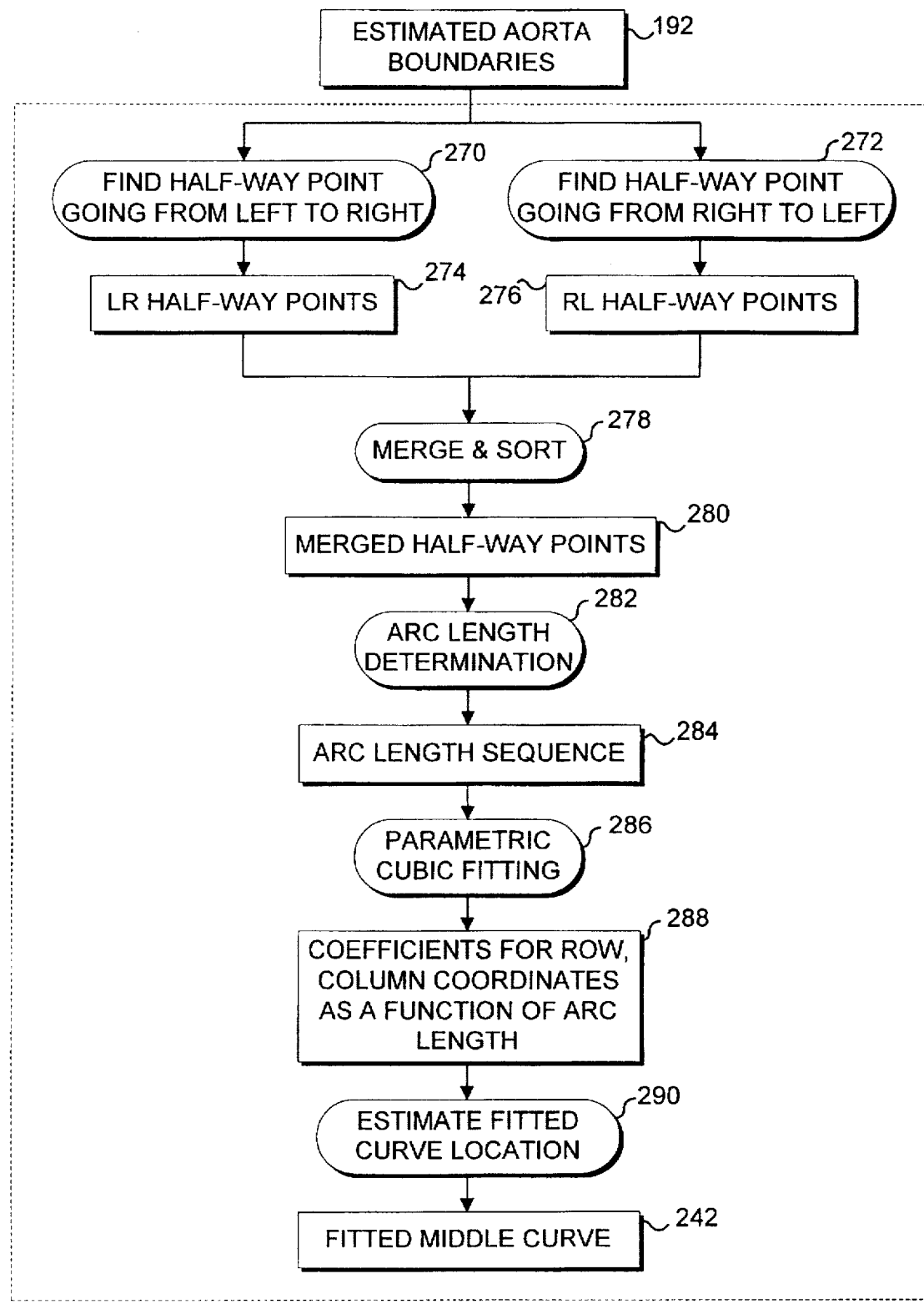
FIG. 10 is a flow chart showing the steps used for finding the middle curve within the aorta.

Turning to FIG. 10, the estimated aorta boundary data are input to both a block 270 and a block 272. In block 270, a procedure finds the half-way point between the two boundaries, going from the left estimated aorta boundary to the right estimated aorta boundary along the shortest path. Conversely, in block 272, the half-way point is found going from the right estimated aorta boundary to the left along the shortest path. Blocks 270 and 272 respectively yield left-to-right half-way points 274, and right-to-left half-way points 276. These points are merged and sorted in row by row order in a block 278, producing merged half-way points 280. Next, the merged half-way points are input to a block 282, where a sequence of arc lengths 284 is calculated as the distance between consecutive half-way points. The arc length sequence is input to a block 286. Block 286 applies a parametric least squares cubic fitting algorithm to the merged half-way points, yielding the coefficients for the cubic fit of row coordinates and column coordinates, both as a function of arc length (in pixels) in a block 288. From the row and column coordinates as a function of arc length in block 288, a best fit curve is determined in a block 290 to estimate fitted middle curve 242.

Figure 14:
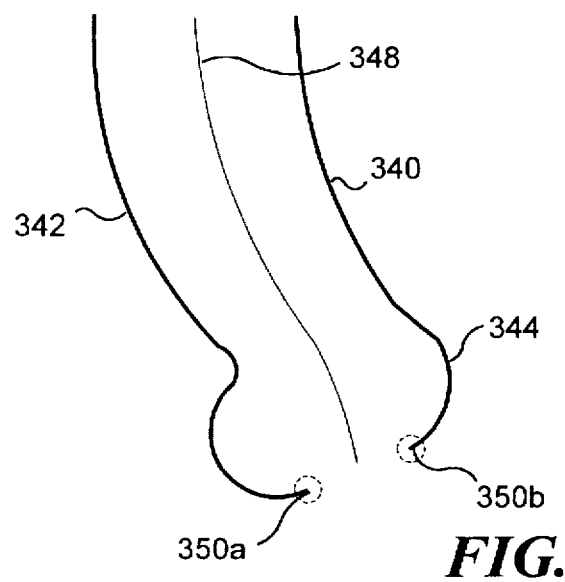
FIG. 14 is a view showing the sides of the aorta identified relative to the middle curve of the aorta using the technique of the present invention, and further showing the end points of the aorta that define the aortic valve plane.

Again referring back to FIG. 9, fitted middle curve 242 is applied to a procedure in a block 244. This procedure determines the shortest distance between the boundaries and the middle curve, producing a shortest distance sequence in a block 246. The shortest distance sequence is input to a block 248 to estimate local maxima and minima distances, generating a sequence of local maxima and local minima in a block 250. The sequence of local maxima and local minima are used to find the bulging part of the aorta boundary i.e., the sinus of Valsalva, which is located immediately adjacent to the aortic valve. Criteria for finding the bulging part of the aorta boundary in a block 252 examine the sequence from top to bottom along the boundary, looking for a local maximum that is followed by a local minimum. The coordinates of the local maxima and local minima of the bulging parts of the left and right aorta boundaries are used to form a feature vector 258. However, if a bulging part of the aorta boundary is not found, the automatic detection process is rejected, as indicated in a block 256, and the operator is requested to manually identify the aortic valve plane for use as a reference. The feature vector in block 258, a conditional probability in a block 260, and the mean and covariance data for aortic valve location from a block 262 (based on the training data) are employed by a Bayes decision rule in a block 264 to determine if the aortic valve location identified is acceptable. As illustrated in FIG. 14, points 350a and 350b are disposed at the lower distal ends of the aorta boundaries, immediately below a sinus of Valsalva 344, for exemplary aorta boundary 340. As shown in FIG. 13, an aortic valve plane 350 is represented by a line through these two points, which are respectively disposed at the lower distal ends of the left and right aorta boundaries.

Figure 4:
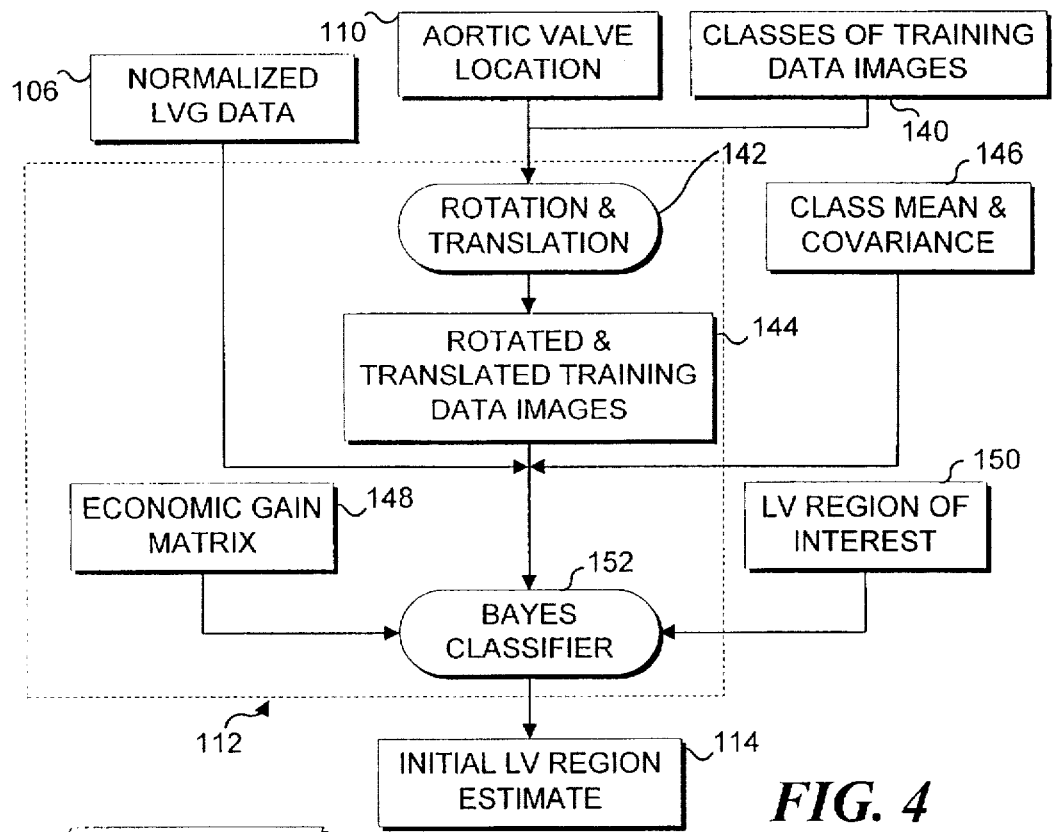
FIG. 4 is a flow chart showing the steps used in estimating the contour of the LV region as a function of gray scale values in successive images taken over a cardiac cycle.

Referring back to FIG. 3, the step in block 112 uses the aortic valve location and the training data to classify the LV pixels in the normalized LVG data over time. Details of block 112 are illustrated in FIG. 4. As shown in FIG. 4, the aortic valve location in block 110 and classes of training data images in a block 140 are applied to a block 142, which provides for rotating and translating the training data with reference to the aortic valve location in the patient, so that the LVs in the training data are aligned and oriented in the same disposition as the LV in the patient's image data. This procedure produces rotated and translated training data, as indicated in a block 144. There are thirteen classes of pixels in the training data images that are determined as described in the material incorporated herein by reference. The rotated and translated training data images, the normalized LVG data, and class mean and covariance data (mean and covariance for each of the thirteen classes) from a block 146 are input to a Bayes classifier, as indicated in a block 152. The Bayes classifier also uses an economic gain matrix 148. The economic gain matrix provides variable parameters that are selected to optimize boundary detection in the ES and ED frames at the expense of the intermediate frames. The Bayes classifier operates on a LV region of interest, in a block 150. The classifier works as described in the materials that have been incorporated herein by reference. The output of Bayes classifier 152 is the initial LV region estimate, in a block 114, which was first discussed above in connection with FIG. 3. Unlike the earlier approach used for estimating the LV region in the ED and ES image frames, the estimate provided in the present invention uses training data that are substantially aligned relative to the aortic valve in the image data for the patient.

Another important aspect of the present invention, compared to the prior work, is the incorporation of a LV edge detection procedure to better define the LV contour along an inferior edge, which is difficult to resolve because of the adjacent tissue of the diaphragm. The initial estimate of the LV contour produced using the classifier typically has an inferior contour that impinges into the area occupied by the diaphragm. This overestimation of the inferior contour by the classifier creates an unacceptable error in the boundary of the LV that is automatically determined. In FIG. 15, a schematic representation of the LV and adjacent diaphragm 364 illustrates this problem. The diaphragm produces a "fuzzy zone" (indicated with a plurality of short wavy lines) into which a classifier boundary 362 extends, well outside an actual border 360 of the LV. In this schematic example, a dashed line represents the classifier boundary. Although the anterior wall of the ground truth border is well defined, an inferior wall 366 is affected by the presence of the diaphragm and the uncertainty that the diaphragm produces in the contour determined by the classifier.

To compensate for the effects of the diaphragm, in FIG. 3, diaphragm mask 116 is applied so that the diaphragm is eliminated from the initial estimate of the LV region in block 118. Details of the procedure used for masking the diaphragm from the initial estimate of the LV region are illustrated in FIG. 17.

Referring now to FIG. 17, normalized LVG data at a resolution of 384×512 pixels are input to both an LV edge detection procedure 400 and to a LV pixel classification procedure 402. The LV edge detection procedure produces edge boundary row and column coordinates, as indicated in a block 404. Details of the LV edge detection procedure are illustrated in FIG. 18.

Referring now to FIG. 18, a block 420 defines a window size (9×9 or 11×11 pixels in the preferred embodiment) for the normalized LVG image data. The images are each divided into overlapping windows. The gray scale data in each window are input to a least squares bivariate cubic fitting procedure, as indicated in a block 422, along with a gradient threshold and angle range from a block 426. The training data are used to define values for the gradient threshold and for the gradient angle range that will produce dark shoulder edges that are most likely to form a part of the LV contour. The result of the cubic fit in all windows in the images is cubic fitted LVG data, as noted in a block 424. To perform edge detection in block 428, the bivariate cubic fit is cut by a plane oriented in a direction selected to form a cubic polynomial. If the gradient magnitude exceeds the threshold and if the gradient angle is within range, the relative minimum of the cubic polynomial is determined (i.e., assuming that the relative minimum exists). An edge is located at the position of this relative minimum. This process produces LVG images that include detected edges, as indicated in a block 430. Ellipse parameters from a classifier in a block 432 are derived by fitting an ellipse to the initial LV region estimate for ED and ES in block 114 of FIG. 3 (same as the classified LVG in block 406 of FIG. 17), and then both enlarging and shrinking the ellipse to produce an elliptical region of interest in which the LV border is generally expected to lie. A mask image 434 is prepared to define the region of interest for the LV contour. Ellipse parameters 432 and mask image 434 are applied to the edge images of block 430 to perform masking, as indicated in a block 436. The procedure yields edges in the region of interest for the LV contour, as provided in a block 438.

In the preferred embodiment, the procedure for developing the mask image 434 includes the details shown in FIG. 19. Using the normalized LVG image frames for the portion of the cardiac cycle from ED to ES in block 106, a block 450 provides for generating a maximum image 452. This procedure examines each of the image frames of the patient in the sequence, and for each pixel position in the image frames, selects the brightest gray scale value for assignment to a corresponding pixel to create a synthetic maximum image. The process in block 450 is similar to that of block 180 in FIG. 6, with the exception that all of the image frames are examined in the process of block 450, whereas only a subset of image frames were examined in the process of block 180. The maximum image is input to both a block 454 and a block 456. In block 456, an automatic thresholding procedure processes the maximum image, selecting those pixels that are bright enough to be in the LV or in its immediate surrounding areas and yielding a thresholded image2, in a block 460. Thresholding image2 is a binary, black and white image. The threshold for this selection process is set automatically, based on the mean and variance of the gray scale values. In block 454, either a dilating or closing procedure is applied to the maximum image, for example to fill small dark regions in the white LV region, yielding a dilated or closed image 458. Next, in a block 462, the dilated or closed image is subtracted from maximum image 452, producing a morphological residue image in a block 464. The morphological residue image is white in the regions where dark holes within white regions were "closed" or changed to white in step 454. Again, in a block 466, an automatic thresholding procedure is applied to the morphological residue image, producing a thresholded image1, in a block 468. This step selects pixels just outside a very bright region, as determined by a threshold value. In a block 470, thresholded image1 is logically "ANDED" with thresholded image2, yielding a combined image 472. The ED LV region of interest from block 150 (of FIG. 4), determined from the training data, is logically ANDED with the combined image, as further provided in a block 476, producing mask image 434. This step selects those pixels that are in the region of interest and which are just outside the very bright areas.

Referring back to FIG. 18, the edges in the region of interest in block 438 are input to a block 440 in which a procedure for dynamic linking of rows and column is applied. This procedure produces a row image 442 and a column image 444, which respectively represent the LV boundary using row and column data. These two images are then merged in a block 446, yielding LV edge boundary coordinates in a block 448.

Turning back to FIG. 17, the edge boundary coordinates from block 448 are evaluated in a block 408, producing evaluated edge boundaries. Details of the evaluation are discussed below. The evaluated edge boundaries and classified LVG border from a block 406 are then combined in block 118 (from FIG. 3) to mask the region below and left of the inferior LV boundary, yielding a LV region without the diaphragm in a block 414. FIGS. 16A and 16B illustrate a classifier boundary 380 and LV edge boundaries 384a and 384b, showing how the two are combined to form the composite boundary using end portions 380a and 380b of the classifier boundary and LV edge boundaries 384a and 384b.

Details of the procedure referenced in block 118 (from FIGS. 3 and 17) are illustrated in FIG. 21, which is discussed below. The LV region without the diaphragm is input to block 134, which applies the global shape constraints discussed above.

Referring to FIG. 20, the steps used in evaluating the edge boundaries are illustrated. Block 404 includes edge boundaries that are produced by the LV edge detection system in terms of row and column coordinates. In addition, a block 480 includes data defining a dividing long axis line that extends through the center of the LV region. This long axis line extends down from the midpoint of the aortic valve (determined above) at a predefined angle, which is determined from the training data. In a block 482, a plurality of perpendicular lines are created relative to the dividing long axis line. A procedure in a block 484 counts the number of intersections of the perpendicular lines with the estimated edge boundaries of the LV, on both sides of the long axis line. It should be noted that multiple, and sometimes overlapping, edge boundary segments may have been estimated on one or both sides of the long axis line, or that there may be gaps between edge boundary segments on one or the other side of the long axis line. This step yields four sets of results, as indicated in a block 486. In block 486, W1 and W2 indicate the estimated edge boundaries on opposite sides of the long axis line. A constant 488 is combined with the data in block 486 for use in generating a feature vector, as indicated in a block 490. The components of the feature vector are the number of perpendicular lines that intersect both W1 and W2, the number of lines that intersect W1 but not W2, the number of lines that intersect W2 but not W1, and the number of lines that fail to intersect either W1 or W2. The four squares in block 486, from left to right, respectively indicate these four values. The procedure in block 490 generates a feature vector F as indicated in block 258. The feature vector is used in connection with regression coefficients derived from the training data, as identified in a block 492, to evaluate the likelihood that the estimated edge boundary is an accurate representation of the LV boundary, in accord with a block 494. The step in block 494 yields the evaluated edge boundaries noted in a block 410, in terms of the row and column coordinates.

Referring to FIG. 21, the good (i.e., acceptable) edge boundaries from block 410 and the classifier LVG boundaries from block 406 are input to a block 500 that modifies the classifier LVG boundary by removing (i.e., masking) the region below and left of the inferior LV boundary. The result of the step in block 500 is the classifier LVG boundary without the effect of the diaphragm, providing images with a resolution 384×512 in the preferred embodiment, as referenced in block 414.

It will be understood that the method described above is defined by machine language instructions comprising a computer program. The computer program is stored on memory media such as floppy disks, a computer disk-read only memory (CD-ROM), a tape for distribution and execution by other computers. It is also contemplated that the program can be distributed over a network, either local or wide area, or over a network such as the Internet. Accordingly, the present invention is intended to include the steps of the method described above, as defined by a computer program and distributed for execution by any appropriate computer.

Although the present invention has been described in connection with the preferred form of practicing it and certain modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for automatically determining a contour of an internal organ in a patient based upon digital image data of a region in which the organ is disposed, said image data representing a sequence of image frames of the region made over an interval of time during which a wall of the organ has completed at least one cycle of movement, the wall of the organ undergoing repetitive cycles of movement as part of the organ's physiological function, each image frame of said sequence of image frames comprising a plurality of pixels, said method comprising the steps of:

(a) developing an initial estimate of a region bounded by the contour of the organ in each image frame of the sequence, by comparing the image data with parameters derived from training data that were previously produced through manual evaluation of a plurality of image frames over a corresponding cycle for each of a plurality of corresponding organs in other individuals, said parameters that are derived from the training data being used to assign classes to the pixels comprising each of the image frames of the sequence, said classes indicating pixels that are most likely inside the contour of the organ in each image frame; and (b) determining a border of the organ in a portion of the contour adjacent to a tissue mass lying outside the organ, by masking out the tissue mass, thereby refining the initial estimate of the region bounded by the contour of the organ so that the border of the organ is more accurately defined in said portion of the contour.

2. The method of claim 1, wherein an edge detector is used for detecting the border of the organ, producing an edge boundary that is used to determine the border in said portion of the contour.

3. The method of claim 2, further comprising the steps of:

(a) applying the training data to determine a masked region adjacent to and outside said portion of the contour; and (b) combining the masked region with the edge boundary to refine the initial estimate of the region and thereby to produce a more accurate contour of the organ at said portion of the contour.

4. The method of claim 3, wherein the masked region is determined using a morphological process.

5. The method of claim 4, wherein the morphological process employs:

(a) one of a morphological opening and closing process;

(b) an automatic thresholding process that applies a threshold for determining a state of pixels in the masked region; and (c) the training data.

6. The method of claim 2, further comprising the step of using dynamic programming to link edge row and column components together to form the edge boundary.

7. The method of claim 1, further comprising the step of more accurately defining the border for each image frame, by applying global shape constraints that relate physical shape attributes of the organ to the contour bounding the region.

8. The method of claim 1, wherein the step of developing an initial estimate of the region bounded by the contour of the organ in each image frame of the sequence comprises the steps of:

(a) estimating a reference location associated with an anatomical feature of the patient's organ using the image frames of the sequence; and (b) aligning a reference location associated with a corresponding anatomical feature in the training data with the reference location associated with the anatomical feature of the patient's organ, prior to assigning classes to the pixels, to ensure that the classes assigned to the pixels as a function of the training data are not in error due to differences in the disposition of the organ in the patient and the training data.

9. The method of claim 8, wherein the step of estimating the reference location associated with the anatomical feature comprises the steps of:

(a) creating a synthetic image having a relatively maximum contrast, by selecting a brightest pixel at each pixel position from among each of the image frames comprising the sequence, for application to each corresponding pixel comprising the synthetic image;

(b) as a function of an extent of the anatomical feature in the training data, estimating a limited region for the anatomical feature in the synthetic image;

(c) estimating a boundary for the anatomical feature within the limited region; and (d) as a function of the boundary estimated for the anatomical feature, estimating the reference location related to the anatomical feature.

10. The method of claim 9, wherein the step of estimating the boundary comprises the step of estimating a center of the anatomical feature.

11. The method of claim 9, wherein the step of estimating the boundary comprises the steps of projecting a gray scale profile along a predetermined angle, and as a function of the gray scale profile, determining a limited region for the contour of the anatomical feature.

12. The method of claim 1, wherein an edge detector is used for detecting the border of the tissue mass adjacent to the organ, producing an edge boundary that is used to determine a border segment between the organ and the tissue mass, said border segment representing an anatomic feature of the patient's organ.

13. The method of claim 12, further comprising the steps of:

(a) applying the training data to estimate a limited region adjacent the border segment;

(b) estimating a boundary for the tissue mass as a function of the limited region; and (c) as a function of the boundary estimated for the tissue mass, estimating a disposition of the anatomic feature.

14. The method of claim 1, wherein the method is embodied in a computer program that is stored on a memory media and adapted to be executed by a computer to implement the steps of the method.

15. A method for automatically determining a contour of an internal organ in a patient based upon digital image data of a region in which the organ is disposed, said image data representing a sequence of image frames of the region made over an interval of time during which a wall of the organ has completed at least one cycle of movement, the wall of the organ undergoing repetitive cycles of movement as part of the organ's physiological function, each image frame of said sequence of image frames comprising a plurality of pixels, said method comprising the step of:

(a) aligning a reference location associated with an anatomical feature of the organs represented by training data with a reference location associated with a corresponding anatomical feature of the organ in the patient, where the training data were previously produced from a plurality of image frames over a corresponding cycle for each of a plurality of corresponding organs in other individuals; and (b) developing an estimate of a region bounded by the contour of the organ in each image frame of the sequence, based upon a comparison of the image data with parameters derived through manual evaluation of the training data, said parameters derived from the training data being used to assign classes to the pixels comprising each of the image frames of the sequence, said classes indicating pixels that are most likely inside the contour of the organ in each image frame.

16. The method of claim 15, wherein the reference location is disposed at one end of the anatomical feature.

17. The method of claim 15, wherein the step of estimating comprises the step of producing a synthetic image comprising a plurality of pixels, each of said plurality of pixels of the synthetic image comprising a brightest pixel from each corresponding pixel of the sequence of image frames.

18. The method of claim 17, further comprising the step of estimating a region that contains said anatomical feature within the synthetic image, as a function of the training data.

19. The method of claim 18, further comprising the step of estimating contour boundary regions within the feature region, said boundary regions encompassing substantial portions of the contour of the anatomical feature.

20. The method of claim 19, further comprising the step of employing the training data to estimate the contour boundary regions.

21. The method of claim 19, wherein a dynamic programming search is employed to estimate a contour of the anatomical feature.

22. The method of claim 19, further comprising the step of removing anti-parallel line pairs, said anti-parallel line pairs comprising non-anatomic elements within the digital image data.

23. The method of claim 19, further comprising the step of estimating a middle curve of the anatomic feature.

24. The method of claim 19, further comprising the step of projecting gray scale levels within the feature region at a predefined angle.

25. The method of claim 15, wherein the organ comprises a left ventricle and the anatomical feature comprises an aortic valve.

26. The method of claim 15, wherein the method is embodied in a computer program that is stored on a memory media and adapted to be executed by a computer in order to implement the steps of the method.

\* \* \* \* \*